United States Patent
Lablans

(10) Patent No.: US 8,374,289 B2
(45) Date of Patent: Feb. 12, 2013

(54) GENERATION AND DETECTION OF NON-BINARY DIGITAL SEQUENCES

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 747 days.

(21) Appl. No.: 12/502,410

(22) Filed: Jul. 14, 2009

(65) Prior Publication Data

US 2009/0285326 A1  Nov. 19, 2009

Related U.S. Application Data

(63) Continuation-in-part of application No. 11/065,836, filed on Feb. 25, 2005, now Pat. No. 7,580,472.

(60) Provisional application No. 60/547,683, filed on Feb. 25, 2004, provisional application No. 60/575,948, filed on Jun. 1, 2004.

(51) Int. Cl.
*H03D 1/00* (2006.01)

(52) U.S. Cl. .................................. 375/343; 375/286

(58) Field of Classification Search .................. 375/343, 375/286, 142, 150, 208; 380/268, 270, 46
See application file for complete search history.

(56) References Cited

U.S. PATENT DOCUMENTS

| | | | |
|---|---|---|---|
| 3,129,340 A | 4/1964 | Baskin | |
| 3,142,037 A | 7/1964 | Gazale | |
| 3,210,529 A | 10/1965 | Hanson | |
| 3,283,256 A | 11/1966 | Hurowirz | |
| 3,492,496 A | 1/1970 | Callan | |
| 3,515,805 A | 6/1970 | Fracassi et al. | |
| 3,586,022 A | 6/1971 | Bauer | |
| 3,649,915 A | 3/1972 | Mildonian | |
| 3,656,117 A | 4/1972 | Maley et al. | |
| 3,660,678 A | 5/1972 | Maley et al. | |
| 3,663,837 A | 5/1972 | Epstein et al. | |
| 3,671,764 A | 6/1972 | Maley et al. | |
| 3,718,863 A | 2/1973 | Fletcher et al. | |
| 3,760,277 A | 9/1973 | Whang | |
| 3,988,538 A | 10/1976 | Patten | |
| 3,988,676 A | 10/1976 | Whang | |
| 4,286,333 A | 8/1981 | Franklin | |
| 4,304,962 A | 12/1981 | Fracassi et al. | |
| 4,378,595 A | 3/1983 | Current | |
| 4,383,322 A | 5/1983 | Halpern et al. | |
| 4,775,984 A | 10/1988 | Jaffre et al. | |
| 4,808,854 A | 2/1989 | Reinagel | |
| 4,815,130 A | 3/1989 | Lee | |
| 4,856,980 A | 8/1989 | Laurita | |
| 4,984,192 A | 1/1991 | Flynn | |
| 4,990,796 A | 2/1991 | Olson | |
| 5,017,817 A | 5/1991 | Yamakawa | |
| 5,157,689 A | 10/1992 | Kurihara | |

(Continued)

OTHER PUBLICATIONS

Rogers, Derek P., "Non-Binary Spread-Spectrum Multiple-Access Communications" *Derek Rogers, Ph. D. Thesis, 213 pages, The University of Adelaide, Faculty of Engineering, Adelaide, Australia, Mar. 1995.*

(Continued)

*Primary Examiner* — Shuwang Liu
*Assistant Examiner* — Helene Tayong
(74) *Attorney, Agent, or Firm* — Diehl Servilla LLC

(57) ABSTRACT

Method and apparatus for generating ternary and multi-valued Gold sequences, are disclosed. Also methods to detect ternary and multi-valued sequences are disclosed. The detection can be performed by a ternary or multi-valued LFSR descrambler when the sequences are generated by an LFSR based sequence generator. A wireless system which can assign additional sequences to designated users is also disclosed. The wireless system can also transfer information to user equipment that enables methods for sequence generation and sequence detection.

20 Claims, 26 Drawing Sheets

U.S. PATENT DOCUMENTS

| | | | |
|---|---|---|---|
| 5,230,003 | A | 7/1993 | Dent et al. |
| 5,412,687 | A | 5/1995 | Sutton et al. |
| 5,457,783 | A | 10/1995 | Chhatwal |
| 5,563,530 | A | 10/1996 | Frazier |
| 5,621,580 | A | 4/1997 | Cruz et al. |
| 5,714,892 | A | 2/1998 | Bowers et al. |
| 5,724,383 | A | 3/1998 | Gold et al. |
| 5,745,522 | A | 4/1998 | Heegard |
| 5,761,239 | A | 6/1998 | Gold et al. |
| 5,790,265 | A | 8/1998 | Shikakura |
| 5,790,591 | A | 8/1998 | Gold et al. |
| 5,844,925 | A | 12/1998 | Dent |
| 5,856,980 | A | 1/1999 | Doyle |
| 5,917,914 | A | 6/1999 | Shaw et al. |
| 5,959,871 | A | 9/1999 | Pierzchala et al. |
| 5,978,412 | A | 11/1999 | Takai |
| 5,999,542 | A | 12/1999 | Turner et al. |
| 6,122,376 | A | 9/2000 | Rao |
| 6,133,753 | A | 10/2000 | Thomson et al. |
| 6,133,754 | A | 10/2000 | Olson |
| 6,192,257 | B1 | 2/2001 | Ray |
| 6,288,922 | B1 | 9/2001 | Wong et al. |
| 6,320,897 | B1 | 11/2001 | Fattouche et al. |
| 6,452,958 | B1 | 9/2002 | van Nee |
| 6,477,205 | B1 | 11/2002 | Doblar et al. |
| 6,519,275 | B2 | 2/2003 | Callaway et al. |
| 6,608,807 | B1 | 8/2003 | Lee |
| 6,665,692 | B1 * | 12/2003 | Nieminen ............... 708/250 |
| 6,788,787 | B1 | 9/2004 | Shono et al. |
| 6,816,447 | B1 * | 11/2004 | Lee et al. ............... 369/59.19 |
| 6,956,948 | B1 | 10/2005 | Hwang et al. |
| 7,219,113 | B2 | 5/2007 | Bonaccio et al. |
| 7,436,963 | B2 | 10/2008 | Lo Iacono et al. |
| 2002/0089364 | A1 | 7/2002 | Goldgeisser et al. |
| 2002/0176484 | A1 * | 11/2002 | Ovalekar ............... 375/142 |
| 2003/0063677 | A1 | 4/2003 | Mix et al. |
| 2003/0072449 | A1 | 4/2003 | Myszne |
| 2003/0093713 | A1 | 5/2003 | Werner et al. |
| 2003/0099359 | A1 | 5/2003 | Hui |
| 2003/0165184 | A1 | 9/2003 | Welborn et al. |
| 2004/0021829 | A1 | 2/2004 | Griffin |
| 2004/0032918 | A1 | 2/2004 | Shor et al. |
| 2004/0032949 | A1 | 2/2004 | Forest |
| 2004/0037108 | A1 | 2/2004 | Notani |
| 2004/0042702 | A1 | 3/2004 | Akimoto |
| 2004/0054703 | A1 | 3/2004 | Huber et al. |
| 2004/0068164 | A1 | 4/2004 | Diab et al. |
| 2004/0078576 | A1 | 4/2004 | Geitinger |
| 2004/0085937 | A1 | 5/2004 | Noda |
| 2004/0091106 | A1 | 5/2004 | Moore et al. |

OTHER PUBLICATIONS

Panuwat, Panratanapaitoon "Comparison between Gold and PR-QMF codes for CDMA applications" *Thesis, Curtin University, Bentley, Australia*, (2003).

Malika, De et al., "Fast parallel algorithm for ternary multiplication using I2L technology", *IEEE Trans. on Comp. vol. 43 No. 5*, (May 1994),603-607 pp.

Armanavicius, G. et al., "Analysis of pseudo-noise sequences for multi channel distance measurements", *ISSN 1392-2114 Ultragarasas, Nr. 4(37)*, (2000).

* cited by examiner sequence output sequence output

2002

GENERATION AND DETECTION OF NON-BINARY DIGITAL SEQUENCES

STATEMENT OF RELATED CASES

This application is a continuation-in-part of U.S. patent application Ser. No. 11/065,836, filed on Feb. 25, 2005, which claims the benefit of U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS, and which also claims the benefit of U.S. Provisional Patent Application No. 60/575,948, filed on Jun. 1, 2004, entitled MULTI-VALUE CODING OF SEQUENCES AND MULTI-VALUE MEMORY DEVICES, the entirety of all three applications are hereby incorporated by reference into this document.

BACKGROUND OF THE INVENTION

This invention generally relates to the generation and detection of non-binary digital sequences as applied in communications and other applications. The aspect of using binary digital sequences in applications such as wireless communications and watermarking is well known.

In wireless communication systems, such as CDMA, specific binary sequences, comprising a series of elements or chips representing 0s and 1s are used to code individual digital signals, representing the data to be transmitted, in a spread spectrum fashion. A sequence of binary element represents an individual 0 or a 1. When a system comprises a plurality of users, correct transmission of data requires that each individual transmitter is assigned a unique set of sequences representing a 0 and a 1. Presently, the sequences will still be binary sequences. Systems could also apply multi-coding wherein each user can transmit (and receive) sequences in such a fashion that each sequence represents a multi-state symbol. For instance, in 3-state spread spectrum coding, one may assign unique sequences to a user wherein a sequence represents the symbol 0, 1 or 2.

The application of sequences in for instance a wireless communications system may involve a plurality of users. Such a system requires the use of a set of sequences, wherein the sequences should have adequate individual characteristics. One of those characteristics may be the auto-correlation of a sequence. Another characteristic for distinguishing purposes between sequences may be the cross-correlation properties.

One of the present methods to detect the presence of a particular sequence in a received sequence is by generating a local copy of such a sequence and to compare this local sequence with an equal length part of the received signal.

In view of the limited present capabilities to generate desirable multi-valued digital sequences, there is a need for an easier method to create multi-valued digital sequences. There is also a need for creating new sets of multi-valued digital sequences. There is also a need for an easier detection method and new communication systems using the new sequences.

SUMMARY OF THE INVENTION

The general purpose of the present invention, which will be described subsequently in greater detail, is to provide methods of creating, detecting, and using multi-valued digital sequences. There is a need for creating ternary and other multi-valued data sequences with good correlation properties. In accordance with one aspect of the present invention, method and apparatus for creating and using multi-valued sequences are provided. The multi-valued data has 3 or more possible states. The method includes generating the multi-valued sequences.

In accordance with another aspect of the present invention, the generation of the sequences is performed by multi-valued LFSR based methods and apparatus. Further, the multi-valued LFSR based methods, applying a single LFSR do not use a multiplier.

In accordance with another aspect of the present invention, the multi-valued LFSR based methods may apply a plurality of LFSRs of which at least one LFSR does not use multipliers.

In accordance with another aspect of the present invention multi-valued sequences can be created by inputting sequences created by LFSR based methods into a multi-valued device or method that does not apply multipliers and is not a modulo-n adder.

In accordance with a further aspect of the present invention, the multi-valued sequences can be stored into a memory element and be read at the appropriate time, which may be controlled by a clock signal.

Before explaining several embodiments of the present invention in detail, it is to be understood that the invention is not limited in its application to the details of construction and to the arrangements of the components set forth in the following description or illustrated in the drawings. The invention is capable of other embodiments and of being practiced and carried out in various ways. Sequences may be generated and processed in multi-level form by multi-valued logic circuits. Instead of being generated real-time by circuitry, sequences may also be generated first and stored in memory elements for later use. Multi-level sequences may be processed as multi-valued symbols in multi-valued logic circuitry. Multi-level symbols may also be generated in binary form or translated into binary words, and processed as binary multi-bit words by binary circuitry. Processing of multilevel symbols may also take place by way of computer programs, dedicated or general microprocessors, assisted by Analog/Digital and Digital/Analog converters. Processing may take place by way of electronic, optical, mechanical or other switching means. Also, it is to be understood that the phraseology and terminology employed herein are for the purpose of the description and should not be regarded as limiting.

Multi-value and n-value in the context of this application mean a number n, with n being a positive integer greater than two.

A primary object of the present invention is to provide new methods and apparatus for generating and detecting multi-valued sequences.

An object of the present invention is to provide methods and apparatus for creating and generating multi-valued ternary data sequences, wherein symbols in the ternary sequence have one of 3 states.

Another object of the present invention is to provide novel n-valued sequences, wherein symbols in the n-valued sequence have one of n states.

Another object of the present invention is to provide methods and apparatus for creation of multi-valued data sequences, which sequences may be stored for later use.

Another object of the present invention is to provide methods and apparatus for creation of multi-valued Gold sequences, which sequences may be stored for later use.

Another object of the present invention is to provide methods and apparatus for creation of multi-valued data sequences, which sequences may be generated at the time when they are needed.

Another object of the present invention is to provide methods and apparatus for creation of multi-valued Gold data sequences, which sequences may be generated at the time when they are needed.

Another object of the invention is to provide methods for detecting binary and non-binary sequences generated by LFSR based sequence generators.

Another object of the invention is to create multi-valued sequences which may be used in the communications between transmitters and receivers in mobile wireless communication systems.

Another object of the invention is to create multi-valued sequences which may be used in the communications between transmitters and receivers in fixed wireless communication systems.

Another object of the invention is to create multi-valued sequences which may be used in wireless communication systems with a plurality of transmitters and receivers.

Another object of the invention is to increase transmission capacity of a channel by increasing the user assigned sequences.

Another object of the invention is to increase transmission capacity between users by increasing the capacity of a single channel and by increasing the number of channels between users.

Another object of the invention is to assign users sequences based on existing constraints and detection quality of sequences.

Another object of the invention is to create methods to program user equipment for generating multi-valued sequences.

Another object of the invention is to create methods to program user equipment for detecting multi-valued sequences.

In accordance with a further aspect of the present invention a method is provided for determining with a processor a correlation value between a first sequence of n-state symbols and a second sequence of symbols, an n-state symbol having one of n states with n>2, an n-state symbol being represented by a signal, comprising applying a sequence generator to generate the first sequence of n-state symbols, adding by the processor of a first value to a sum when an n-state symbol in the first sequence and a corresponding symbol in the second sequence are identical and generating by the processor of a signal representing the correlation value when all signals representing the n-state symbols of the first sequence have been processed to determine the sum.

In accordance with yet a further aspect of the present invention the previous method is provided, further comprising subtracting by the processor of a second value from the sum when an n-state symbol in the first sequence and a corresponding symbol in the second sequence are different.

In accordance with yet a further aspect of the present invention the previous method is provided, wherein the method is applied to determine if the first sequence is a maximum length sequence.

In accordance with yet a further aspect of the present invention the previous method is provided, further comprising combining each n-state symbol of the first sequence with a corresponding symbol of a fourth sequence by applying an implementation of an n-state logic function to generate a fifth sequence of n-state symbols.

In accordance with yet a further aspect of the present invention the previous method is provided, wherein the fifth sequence is a Gold sequence.

In accordance with yet a further aspect of the present invention the previous method is provided, wherein the fifth sequence is a Kasami sequence.

In accordance with yet a further aspect of the present invention the previous method is provided, wherein the fifth sequence is received in a communication device.

In accordance with yet a further aspect of the present invention the previous method is provided, wherein an n-state symbol is represented by a plurality of binary signals.

In accordance with another aspect of the present invention a method is provided for determining with a processor a correlation value between a first sequence of n-state symbols and a second sequence of symbols, an n-state symbol having one of n states with n>2, an n-state symbol being represented by a signal, comprising applying a sequence generator to create the first sequence of n-state symbols, determining by the processor of a plurality of correlation values between the symbols of the first sequence and symbols of a plurality of shifted versions of the second sequence, identifying by the processor of at least one peak value in the plurality of correlation values, and determining by the processor from the plurality of correlation values that the first sequence is a maximum length sequence.

In accordance with yet another aspect of the present invention the previous method is provided, wherein the first sequence of n-state symbols is determined by an LFSR.

In accordance with yet another aspect of the present invention the previous method is provided, further comprising combining each n-state symbol of the first sequence with a corresponding symbol of a third sequence by applying an implementation of an n-state logic function to generate a fourth sequence of n-state symbols.

In accordance with yet another aspect of the present invention the previous method is provided, wherein the fourth sequence is a received by a communication device.

In accordance with yet another aspect of the present invention the previous method is provided, wherein an n-state symbol is represented by a plurality of binary symbols.

In accordance with a further aspect of the present invention an apparatus is provided for providing a signal representing a correlation value between a first and a second sequence of n-state symbols, each n-state symbol having one of n states with n>2 and being represented by a signal, comprising a first device including a first input enabled to receive a first signal representing an n-state symbol of the first sequence, a second input enabled to receive a second signal representing a corresponding symbol of the second sequence, and an output that provides a confirmation signal when the n-state symbol of the first sequence and the corresponding symbol of the second sequence are identical.

In accordance with yet a further aspect of the present invention the previous apparatus is provided, further comprising a second device including a first input enabled to receive the confirmation signal, wherein the second device adds a first value to a sum when the confirmation signal is received.

In accordance with yet a further aspect of the present invention the previous apparatus is provided, wherein an n-state symbol is represented by a plurality of binary signals.

In accordance with yet a further aspect of the present invention the previous apparatus is provided, wherein the apparatus is part of a communication system.

In accordance with yet a further aspect of the present invention the previous apparatus is provided, wherein the apparatus is part of a data storage system.

In accordance with yet a further aspect of the present invention the previous apparatus is provided, wherein the apparatus is part of a communication system.

In accordance with yet a further aspect of the present invention the previous apparatus is provided, wherein an n-state symbol is represented by a non-magnitude dependent signal.

BRIEF DESCRIPTION OF THE DRAWINGS

The drawings contain diagrams of LFSR based circuitry. It is well known and assumed that the operation of the shift registers is assisted by a controlling signal, such as a clock signal. In order to minimize the complexity of the diagrams, the depiction of such controlling signals, the diagrams of the related circuitry and the inputs providing such a controlling signal are not included in the diagrams. However, their presence is well known and should be assumed.

Various other objects, features and attendant advantages of the present invention will become fully appreciated as the same becomes better understood when considered in conjunction with the accompanying drawings, and wherein.

DETAILED DESCRIPTION OF THE INVENTION

Transmitting and Receiving Digital Sequences.

The generation of binary or 2-valued sequences has been widely studied and documented. An overview of the art can be found in P. Fan and M. Darnell: "Sequence Design for Communications Applications," John Wiley & Sons, New York, 1996.

There are several aspects related to the usefulness of binary and non-binary sequences. It is assumed that the sequences are generated by a binary or non-binary LFSR (Linear Feedback Shift Register) based circuit. Consequently the sequences have a performance or appearance that is cyclic and can be dependent on the length of the shift register.

Two of the relevant aspects that are important are:
1. The auto-correlation of a sequence
2. The cross-correlation between sequences.

A third aspect that is usually of significance is the occurrence of individual symbols in a sequence. For different reasons, sequences that look like complete random sequences with an equal or almost equal occurrence of possible symbols and with a two-value auto-correlation, are desirable and attractive. A fourth aspect of sequences is orthogonality.

Figure 1:
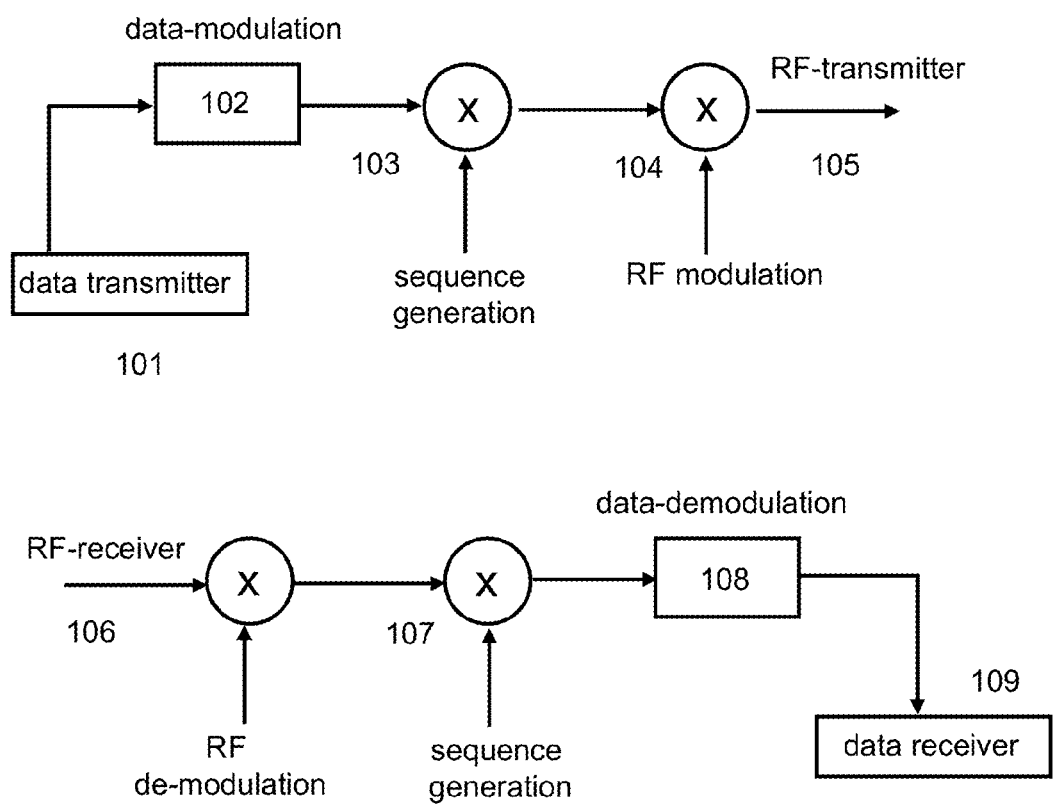
FIG. 1 is a diagram of a spread spectrum transmission and receiver system.

FIG. 1 shows a diagram of the application of sequences in a spread-spectrum coder for wireless application as well as the wireless spread spectrum decoder in signal transmission and reception. The diagram applies to binary and to non-binary systems. A data source 101 provides data which is transformed into a digital data signal by 102. The data-signal is then modulated by a signal spreader 103 into a spread spectrum signal. The circuit 103 may in some cases be considered to be an LFSR based scrambler. In other cases, circuit 103 may be a circuit which replaces an incoming digital signal by a predetermined digital signal. The spread-spectrum signal is provided to a Radio-Frequency modulator that readies the signal for RF transmission. The receiver works in the opposite way. A received RF signal is demodulated by an RF receiver 106. The spread-spectrum baseband signal is provided to a despreader 107. In general, for appropriate dispreading it is required that the despreader 107 provides exactly the same sequence provider by the corresponding spreader 103 synchronized with the provided incoming spread spectrum signal. The despreaded signal is then translated by 108 into data for the data receiver 109.

Figure 2:
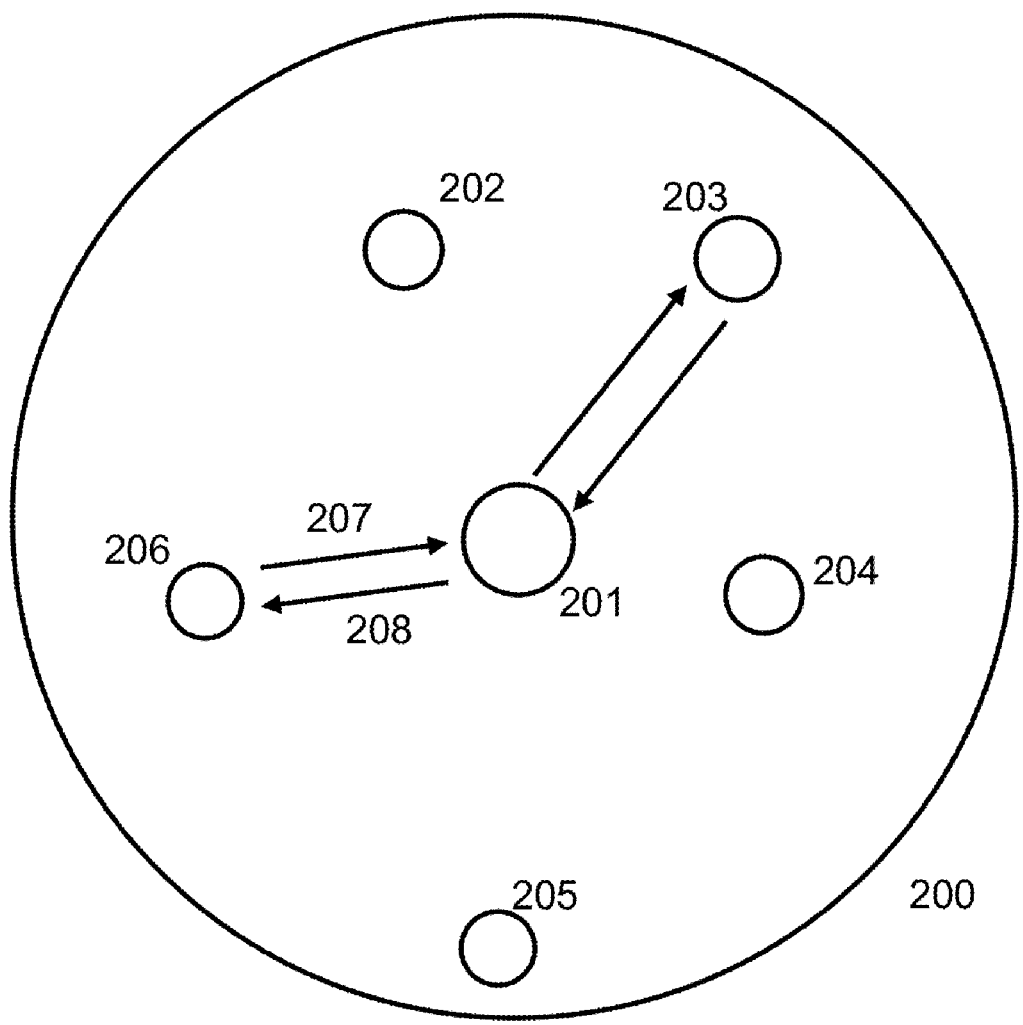
FIG. 2 is a diagram of a wireless cell.

FIG. 2 shows a diagram of a system that can apply the transmitters and receivers of FIG. 1. The system of FIG. 2 comprises a wireless cell 200, controlled by a base station 201 and users 202, 203, 204, 205 and 206. The users may be mobile or fixed in position. It is assumed that users have different bandwidth or data transmission and/or data reception requirements, which may also vary in time. For instance user 206 may, at a certain time, download considerable amounts of data through channel 208 to base station 201, but it does not transmit much data through channel 207. In that case, user 206 requires more bandwidth for channel 208 and perhaps very little for channel 207.

In another case user 206 may transmit a high quality video signal to the base station, but does not receive much data. The situation is reversed compared to the previous case: high bandwidth is required for channel 207 and very little for 208. When user 206 is not active, very little bandwidth is required for either 207 or 208.

Especially in bandwidth congested areas it would be beneficial when base station 201 can dynamically assign bandwidth as required by the needs of active users, thus making much better use of available bandwidth and optimize the use of bandwidth in spectrum constrained circumstances.

In accordance with one aspect of the present invention, multi-value sequences can provide a better use of bandwidth.

In accordance with another aspect of the present invention it is possible to assign more sequences to a single channel, allowing for an increased bandwidth use. In general a channel is assigned two sequences, representing a binary 0 and a binary 1. It is also possible to assign a channel for instance 4 sequences, representing a 4-valued symbol 0, 1, 2 or 3. In that case the assigned bandwidth has essentially doubled for that channel. It is understood that, in those cases, the systems are equipped with methods or apparatus to code and decode information into multi-value symbols. These methods are well known and have been applied in transmission-coding. An example is the 4B3T code.

Multi-coding in CDMA is known. It generally comprises sending multiple orthogonal sequences at the same time to a user. For the detection of each sequence a correlation circuit is required. According to one aspect of the present invention, multi-code or multi-sequence transmission also includes sending one sequence at a time, which sequence can be one of n, representing one of n symbols. Such a multi-code system allows for much easier detection of sequences.

It is also possible to activate additional transmitter/receiver channels for individual users. Such a system is known as a multi-carrier system. The channel can be characterized by a channel method which can be for instance a frequency multiplex, a time division multiplex or a code multiplex technology.

The transmission of multi-state symbols over a single channel makes better use of the channel capacity, though there may be adverse noise effects. A somewhat frustrating aspect of multi-state symbol transmission is that the increase of bandwidth is a logarithmic function of the number of states. Assume the equivalent bandwidth of a binary (or 2-state symbol) system as a comparative baseline. When the number of states is increased from 2 to 8 or by a factor 4, the bandwidth is increased by a factor 3. If it is assumed that increasing the number of states increases the equipment cost for processing the signals, it appears that at a certain stage it is cheaper to increase the number of channels for a user rather than the number of states in transmitted symbols.

An example may clarify this. Suppose that the cost of a channel of a certain bandwidth is 1000. The cost of transmitting a symbol with a certain number of states depends on the number of states and is provided in the following table:

| number of states | cost per state |
|---|---|
| 1-2 | 100 |
| 3-4 | 200 |
| 5-8 | 400 |
| 9-16 | 800 |

The cost of creating a 4-state transmission system is then 1600: 1000 (for the channel) and 200 (for 2 binary)+400 (for 2 additional states)=600 for a 4-state symbol channel. For a single binary channel the cost would be 1200. For an incremental 400, the capacity of the system has been doubled. For an 8-state symbol channel the cost would be: 1000+200+400+1600=3200. For an additional 2000 the capacity of the binary channel has been tripled.

In order to increase the capacity to 4 times the capacity of the binary channel a 16 state symbol has to be used. The cost of this is 1000+200+400+1600+6400=9600. It would be clearly cheaper to create an additional channel. In fact, 2 4-state symbol channels would increase the capacity with a factor 6 compared to a single binary channel.

While the cost example is fictitious and for illustrative purposes only, it should clarify the fact that an optimum price/performance solution in transmission capacity may involve multi-level coding and multi-carrier channels.

For example, in such a case where two parallel channels are in use for one user, with each channel having assigned 8 different sequences can transmit or receive a symbol with 64 different states in the same time that a single binary channel can transmit or receive a symbol with 2 different states.

Ternary (3-Valued) Sequences.

The general approach in generating ternary sequences is based on Galois Field theory. It uses primitive or irreducible polynomials. The degree and coefficients of such a polynomial determines the length of the shift register in the LFSR based sequence generator, the connected taps and the multiplying factors.

Figure 3:
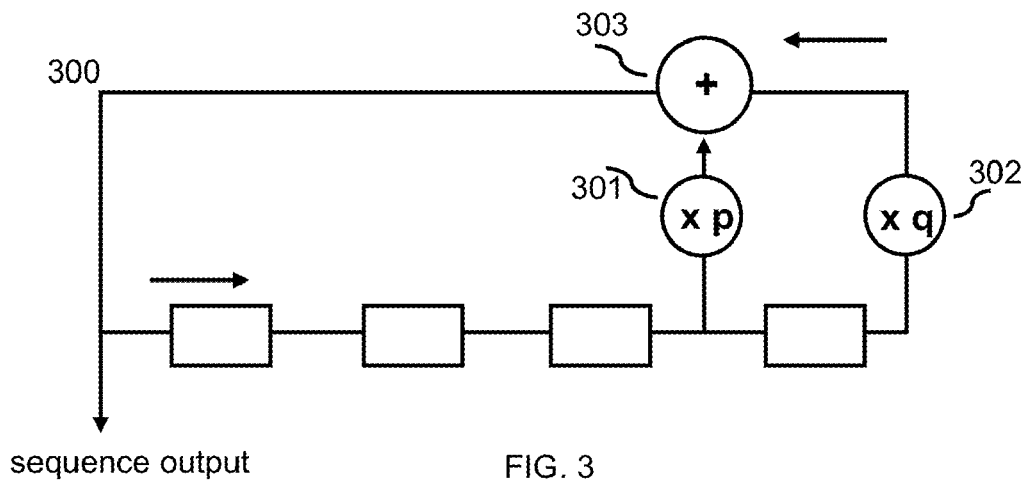
FIG. 3 shows a sequence generator.
Figure 4:
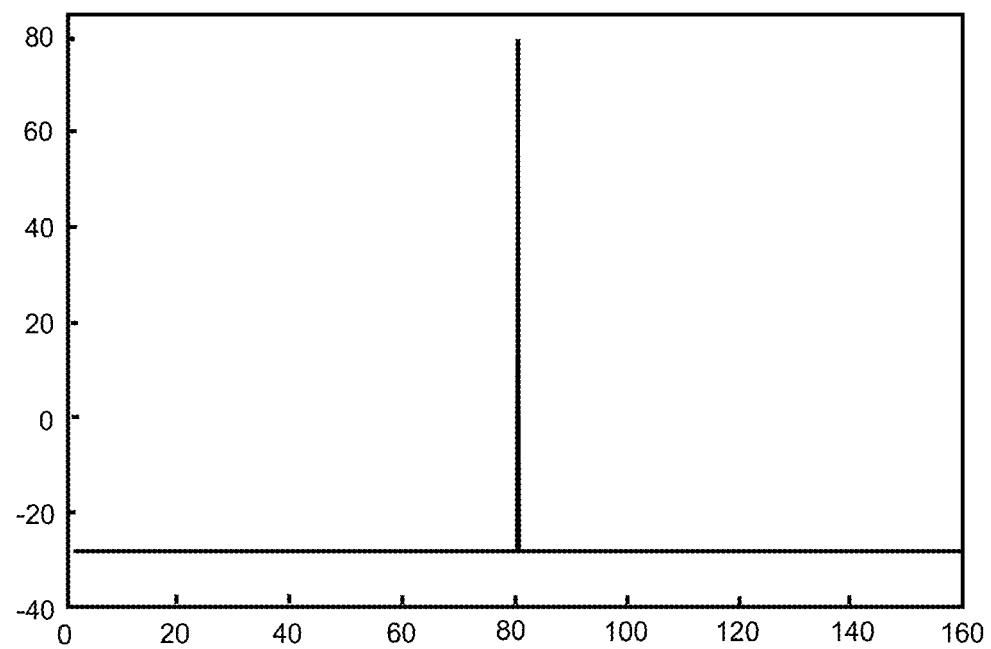
FIG. 4 shows a correlation graph of an m-sequence.

FIG. 3 shows a diagram of a ternary sequence generator, which can be described by a polynomial over GF(3) of degree 4. The circuit 300 contains two multipliers: one multiplier 301, multiplying by p modulo-3 and multiplier 302, multiplying by q modulo-3. According to Galois Field theory, one can create two so-called ternary maximum-length sequences with this configuration. The first configuration is where the multiplying factor p=2 and q=1 in FIG. 3. The other configuration is wherein p=1 and q=1. The auto-correlation graphs of these two sequences have a shape as shown in FIG. 4.

According to an aspect of a previous invention, described in U.S. Non-Provisional patent application Ser. No. 11/042, 645, filed Jan. 25, 2005, entitled MULTI-VALUED SCRAMBLING AND DESCRAMBLING OF DIGITAL DATA ON OPTICAL DISKS AND OTHER STORAGE MEDIA, it is possible to increase the correlation value when two identical coincide and decrease the correlation value when two identical sequences are out of synchronization by changing the correlation calculation. However, the general shape of the correlation graph will stay the same. The two m-sequences generated by the configuration of FIG. 3 are:

p = 1; q = 1    20102112020222211102212100010011012110021020122101011112220112120002002202122001 p = 2; q = 1    20222100110201122020212112102111100010021011120022010221101012122120122220002001

Both sequences are generated with the initial shift register content being [1 0 0 0 2]. Both sequences have a length of 80 ternary symbols.

As is known, other sequences that are cyclically related to the above sequences can also be generated by the circuit or FIG. 3. Thus, there are a plurality of sequences that can be generated by FIG. 3 and a communication system using the sequence generator of FIG. 3 has a plurality of sequences available to communication devices.

The first sequence is generated by the configuration of FIG. 3 with p=1 and q=1. This means the sequence generator is equivalent with the configuration of FIG. 5, wherein the combination of modulo-3 adder with multipliers p and q of FIG. 3 can be replaced by a single ternary logic function ter1. For the case p=1 and q=1 this means that ter1 is equivalent with the modulo-3 addition function.

Figure 5:
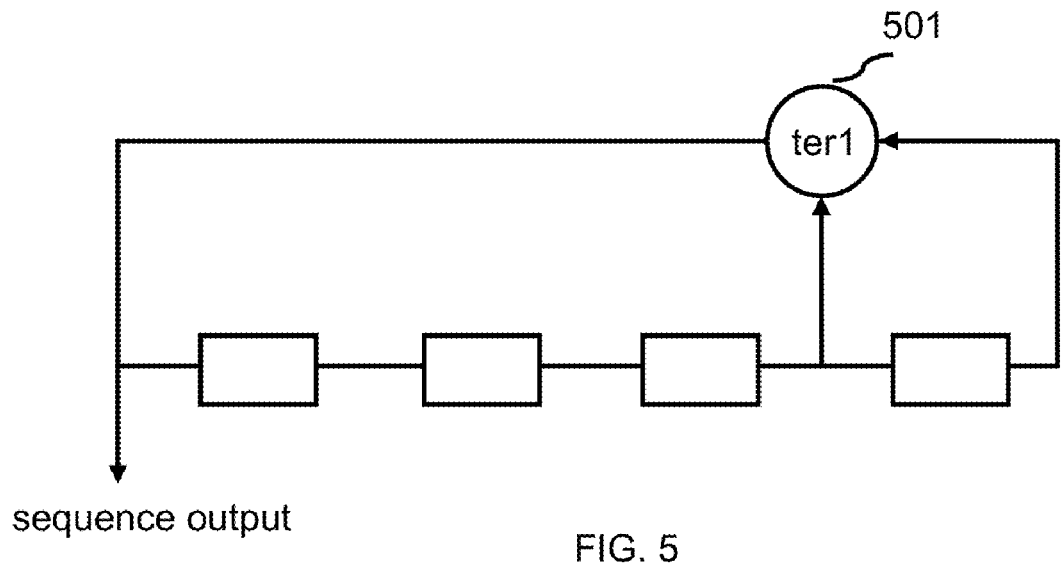
FIG. 5 is a diagram of an LFSR based sequence generator.

For the configuration of FIG. 3 wherein p=2 and q=1 the configuration with function ter1 as shown in FIG. 5 will have a truth table as shown in the next table:

| ter1 | 0 | 1 | 2 |
|------|---|---|---|
| 0    | 0 | 1 | 2 |
| 1    | 2 | 0 | 1 |
| 2    | 1 | 2 | 0 |

Thus, the previous sequences and the related sequences can be generated by the circuit or FIG. 5.

According to one aspect of an invention described in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; by the inventor, it is possible to generate additional m-sequences in the configuration of FIG. 5 by applying additional ternary reversible scrambling functions by ternary device 501. It was demonstrated in the cited Patent Application that one can change the ternary logic function ter1 by inserting reversible ternary inverters in the path of the signals. This is shown in a diagram in FIG. 6. This sequence generator has a ternary function ter1 in device 601, followed by a ternary inverter 602. By inserting an inverter inv=[1 2 0] and then an inverter inv=[2 0 1] in the circuit after ternary logic function ter1, one can generate two additional ternary m-sequences which are not anticipated by the existing theory and are novel. The two m-sequences in addition to the sequence generated with the configuration with p=2 and q=1 are shown in the following table:

The sequences seq_ad_2 and seq_ad_3 are generated with the initial content of the shift register being [1 0 0 2], which is the same as used in the previous examples of sequences generated without using the inverters. As known from LFSR based theory, the influence of the initial content of the shift register is that virtually the same sequence will be generated (with the same auto-correlation properties and same distribution of elements), however it will appear as a shifted version of sequences generated with different initial shift register content.

As an example the sequence generator which generated sequence seq_ad_3 with initial shift register content [1 0 0 2] will be used again but with different initial shift register content. The results of 4 of those situations are shown in the following table:

| shift register | sequence |
|----------------|----------|
| [1 1 0 0] | 21210100102100002220221020001221120211002020101101201111222122012111022002120011 |
| [1 1 0 1] | 01201111222122012111022002120011212101001021000022202210200012211202110020201011 |
| [1 1 0 2] | 11222122012111022002120011212101001021000022202210200012211202110020201011012011 |
| [1 1 1 0] | 12221220121110220021200112121010010210000222022102000122112021100202010110120111 |

Analysis of the sequences in the table will show that they are shifted versions of each other.

From this one can conclude that a ternary LFSR based sequence generator with a shift register with p elements can generate at the most $(3^p-1)$ different sequences, which are then a shifted version of each other. A 4-element ternary LFSR based sequence generator can generate 80 different sequences.

When one has the means to determine the correct beginning of a sequence (for instance through correlation) then a set of 80 ternary m-sequences is also a set of 80 different orthogonal sequences.

One aspect of the present invention is to use a descrambler as a sequence detector. It will be explained that the shift register in a descrambler will be 'flushed' by the incoming sequence. Consequently, after flushing, the differentiating aspects of the sequences generated by one sequence generator using different initial contents of the shift register will be lost.

The same reasoning will apply to n-valued sequence generators with a shift register of length p. The length of a sequence, without repeating itself in whole or in part can be at most be a length of $(n^p-1)$ elements.

According to one aspect of the invention of the cited invention one can replace the combination of ternary function ter1 with inverter inv=[1 2 0] with a ternary logic function ter with a truth table as shown in the following table to generate seq_ad_2:

| ter | 0 | 1 | 2 |
|-----|---|---|---|
| 0   | 1 | 2 | 0 |
| 1   | 0 | 1 | 2 |
| 2   | 2 | 0 | 1 |

| | |
|---|---|
| seq_ad_2 | 01020220210222211121102122201100121002212120200201200001110112010002112210122001 |
| seq_ad_3 | 12121010010210000222022102000122112021100202010110120111122212201211102200212001 |

One can replace the combination of ternary function ter1 with inverter inv=[2 0 1] with a ternary logic function ter with a truth table as shown in the following truth table to generate seq_ad_3:

| ter | 0 | 1 | 2 |
|---|---|---|---|
| 0 | 2 | 0 | 1 |
| 1 | 1 | 2 | 0 |
| 2 | 0 | 1 | 2 |

Consequently according to different aspects of the invention one can generate more desirable ternary sequences than is possible with the present art by using the ternary logic function shown in the prior two paragraphs. And it is possible to generate ternary sequences with simpler methods using single functions instead of using combinations of modulo-3 addition functions with multipliers or inverters.

According to another aspect of this invention it is possible to create new ternary sequences by using two or more LFSR based ternary sequence generators and combining the outputs of the sequence generators by inputting the output of the sequence generators to a reversible ternary scrambling function. A known way of combining ternary sequences is by applying modulo-3 addition functions. However many more different ternary sequences can be created by applying reversible ternary logic functions, which are not identical to the modulo-3 addition function.

Sequences created by combining other sequences, generally through modulo-n addition, and which have good auto-correlation and cross-correlation properties are known as Gold sequences. One can add another combining step to create for instance Kasami sequences.

Figure 7:
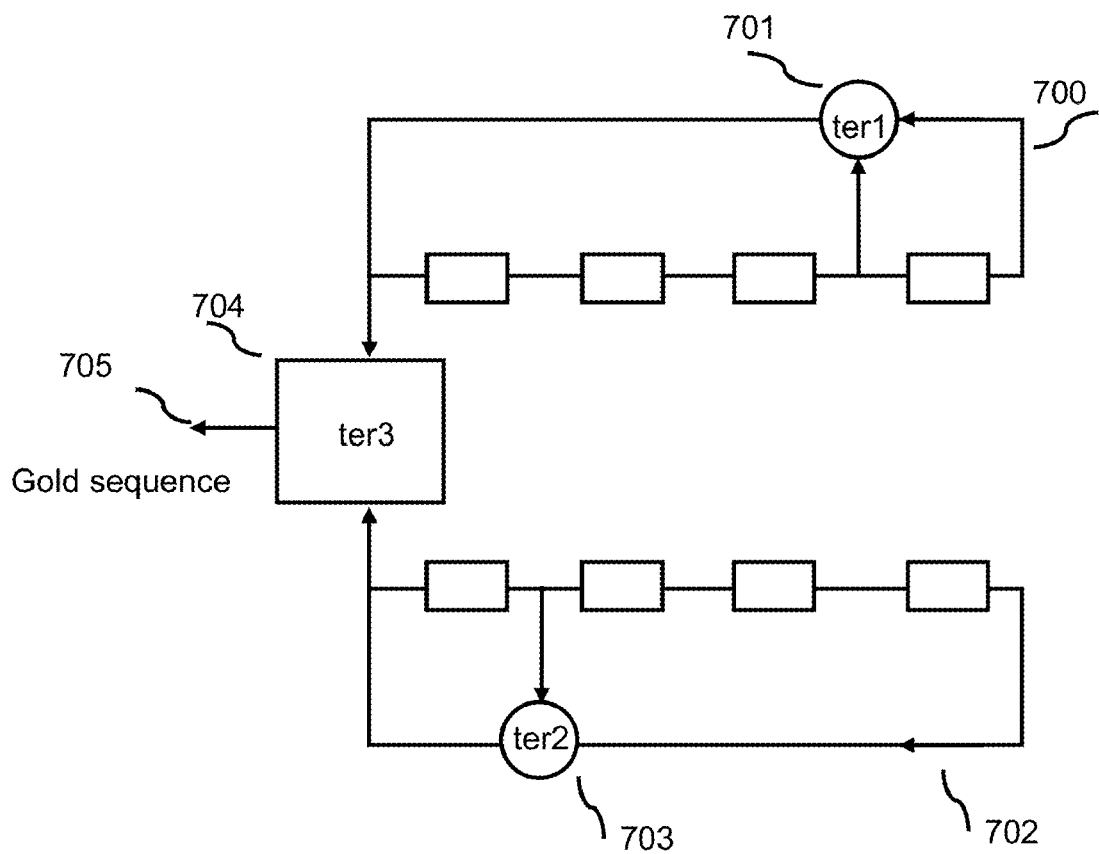
FIG. 7 is a diagram of a Gold sequence generator.

An example of a diagram of a circuit for creating ternary Gold sequences is shown in FIG. 7. The Gold sequence generator comprises a first LFSR based sequence generator 700 with ternary device 701 executing function ter1; a second LFSR based ternary sequence generator 702 with ternary device 703 executing function ter2; the signals of 700 and 702 being inputted to a third ternary device 704 executing function ter3 and outputting a Gold sequence on output 705. The truth tables of the ternary logic functions ter1, ter2 and ter3 are shown in the following tables:

| ter1 | 0 | 1 | 2 |
|---|---|---|---|
| 0 | 2 | 0 | 1 |
| 1 | 1 | 2 | 0 |
| 2 | 0 | 1 | 2 |

| ter2 | 0 | 1 | 2 |
|---|---|---|---|
| 0 | 0 | 1 | 2 |
| 1 | 2 | 0 | 1 |
| 2 | 1 | 2 | 0 |

| ter3 | 0 | 1 | 2 |
|---|---|---|---|
| 0 | 0 | 2 | 1 |
| 1 | 1 | 0 | 2 |
| 2 | 2 | 1 | 0 |

Figure 8:
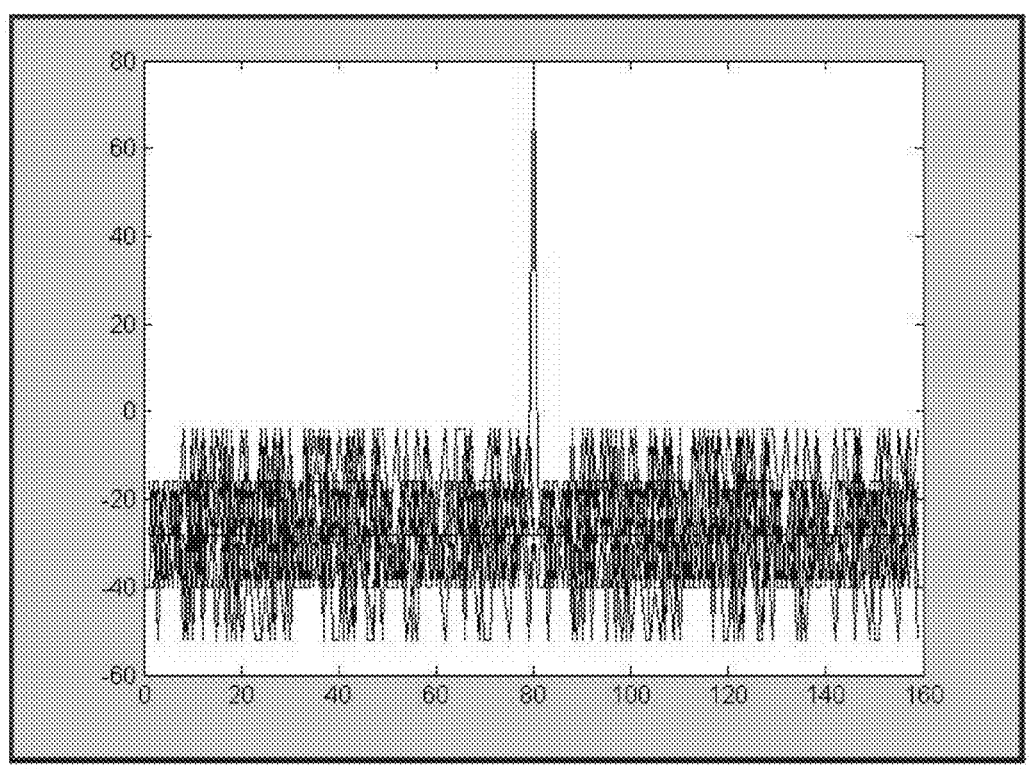
FIG. 8 is an overlay graph of auto-correlation and cross-correlation.

A series of 80 different ternary Gold sequences can be created by keeping the initial content of the shift register of the second sequence generator 702 with ter2 the same but changing the initial content of the shift register of the first sequence generator 700 with ternary logic function ter1. FIG. 8 shows the correlation graph constructed by overlaying the autocorrelation of the first Gold sequence, with the cross correlation of the first Gold sequence and the next 20 Gold sequences. The graph shows how the cross-correlation values stay within a certain range. And it shows the clear distinguishing peak in the auto-correlation. The literature shows different efforts in creating non-binary Gold sequences. The combining function (called ter3 in FIG. 7) that is applied in the known literature is generally the modulo-n function or the modulo-3 addition in the ternary case.

According to one aspect of the present invention all possible reversible ternary functions can be used to combine two ternary sequences. Many of the generated ternary sequences, created by combining two ternary sequences through a ternary reversible function not being the modulo-3 addition, may show attractive or adequate correlation properties. A computer program can be used to generate and select the sequences based on pre-determined correlation criteria. When the cross-correlations between these sequences, created by combining two ternary sequences, assume values within a limited range, and the individual auto-correlation graphs show a significant single peak value compared to the rest of the correlation values, the sequences may be considered ternary Gold sequences.

Detection of Ternary Sequences.

Detection of binary sequences usually takes place by way of correlation techniques. The received sequence is correlated with a local copy of the to be detected binary sequence. In many cases the received sequence can be considered to be a superposition of different binary sequences which are orthogonal in cross-correlation. In non-orthogonal cases wherein other sequences do not influence the to be detected sequences in an unmanageable way or wherein they can be considered to be a noise like contribution to the signal it is possible to apply other detection mechanisms.

One such mechanism has been explained by the inventor as one aspect of his inventions in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA.

The mechanism described in the cited Patent Application applies the relation between LFSR based sequence generators and LFSR based scramblers and descramblers. It is possible to descramble the sequence generated by any (binary and non-binary) LFSR based sequence generator into a sequence of identical symbols.

Figure 9:
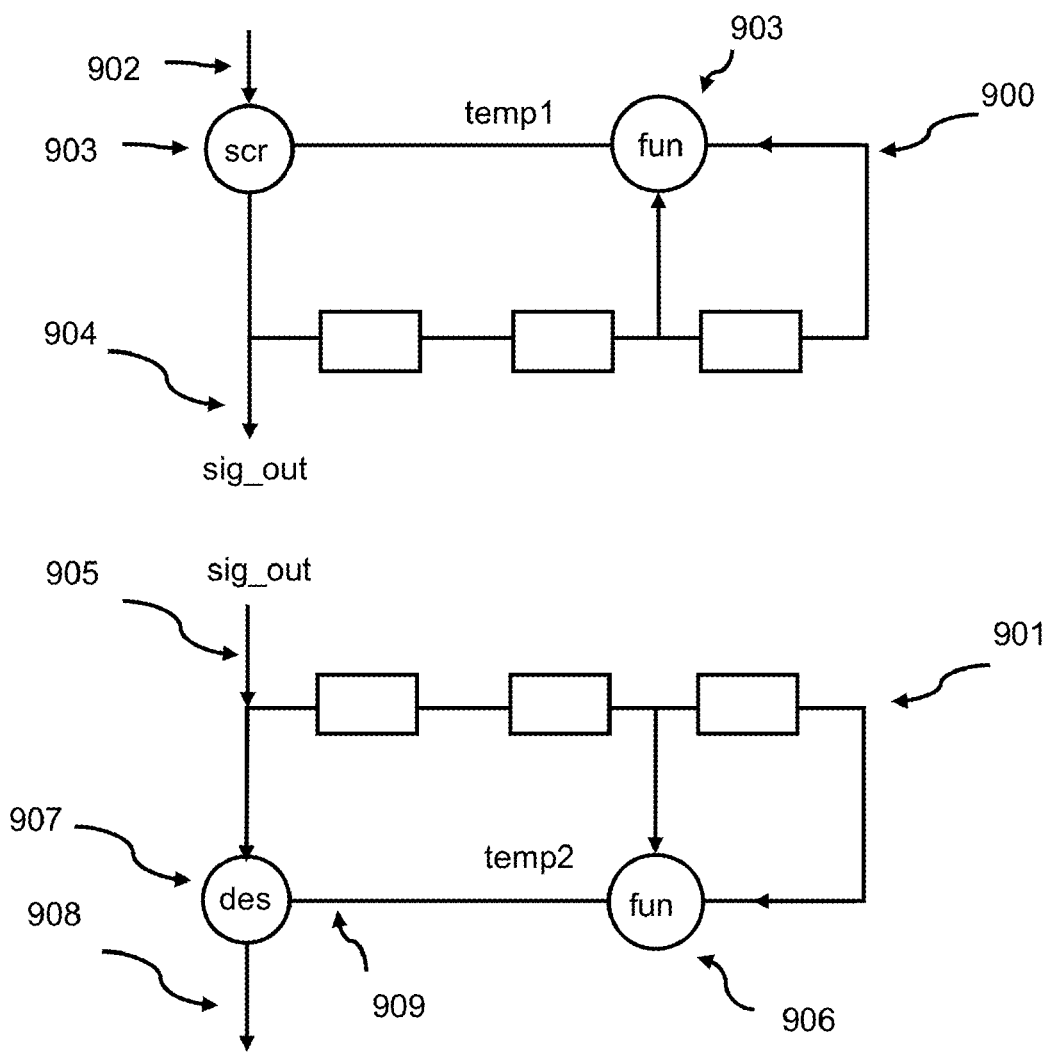
FIG. 9 is a diagram of an LFSR based scrambler and its descrambler.

FIG. 9 shows the generic LFSR based scrambler/descrambler combination. This applies to any n-valued logic. It is to be understood that this is an illustrative example only and that according to different aspects of the invention the length of the shift register as well as the number and the properties of the applied logic functions can vary. In general the circuit 900 is used as the scrambler and circuit 901 as descrambler.

The rules are such that for 900 and 901 to be a scrambling/descrambling pair, they should have the same length shift register. The functions 903 and 906 should be connected to the same tap and their functions should be identical. The functions of 903 and 907 should form a reversing scrambling pair. That is: the function des should inverse the function scr. The functions of 903 and 907 can be identical when scr is self-reversing.

One can actually switch the roles of scrambler and descrambler. In that case the descrambler (previously used as the scrambler) is no longer self-synchronizing and a synchronization circuit is required. Because in that case there will be no "flushing effect" of the shift register in the descrambler, it is essential to start scrambler and descrambler with the same initial content in the shift registers.

For detection purposes, it is advantageous to use scrambler and descramblers in the self-synchronizing setting. In that situation only the first m symbols in a p length sequence in a descrambled sequence can be incorrect, wherein m is the number of shift register elements. Also if the descrambler loses synchronization because of errors in the individual elements of a sequence, after flushing the shift register of the descrambler, synchronization is re-established.

Figure 10:
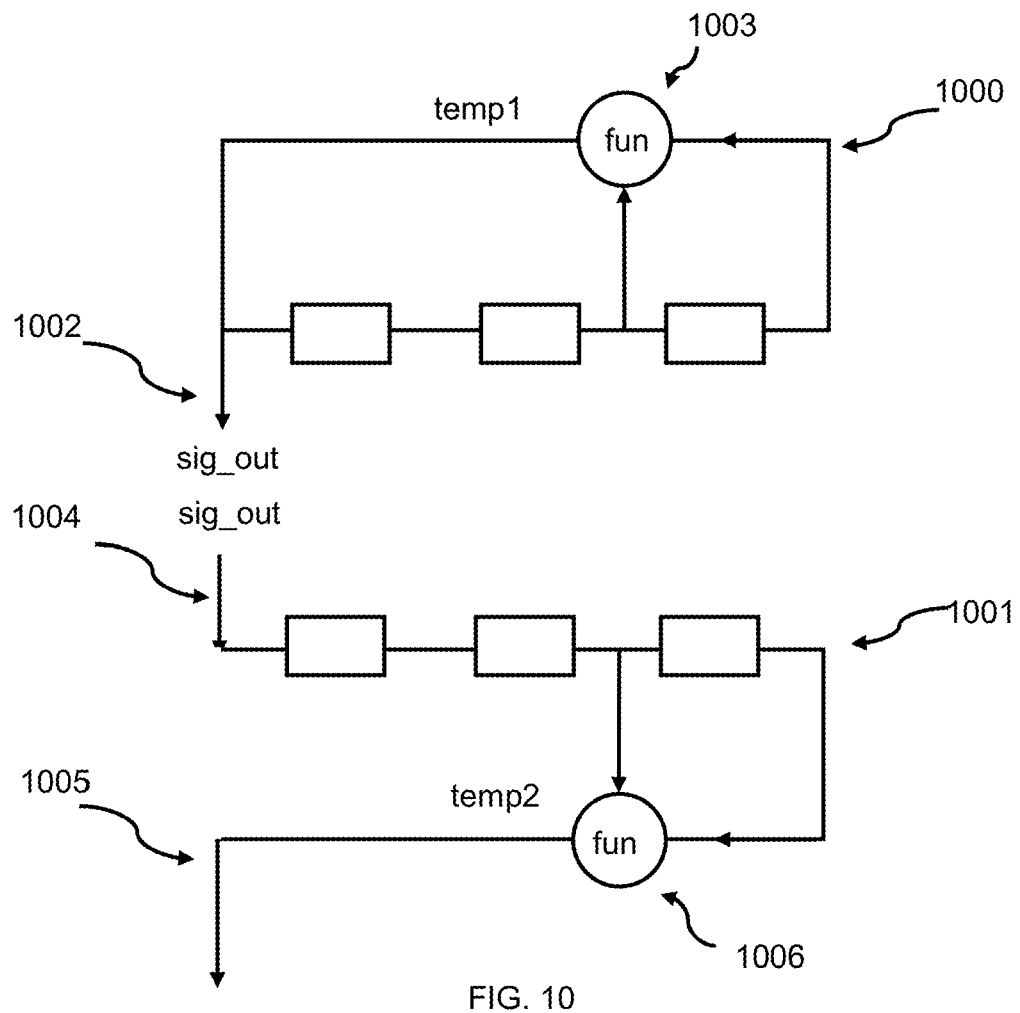
FIG. 10 is a diagram of a sequence generator and a partial descrambler.
Figure 11:
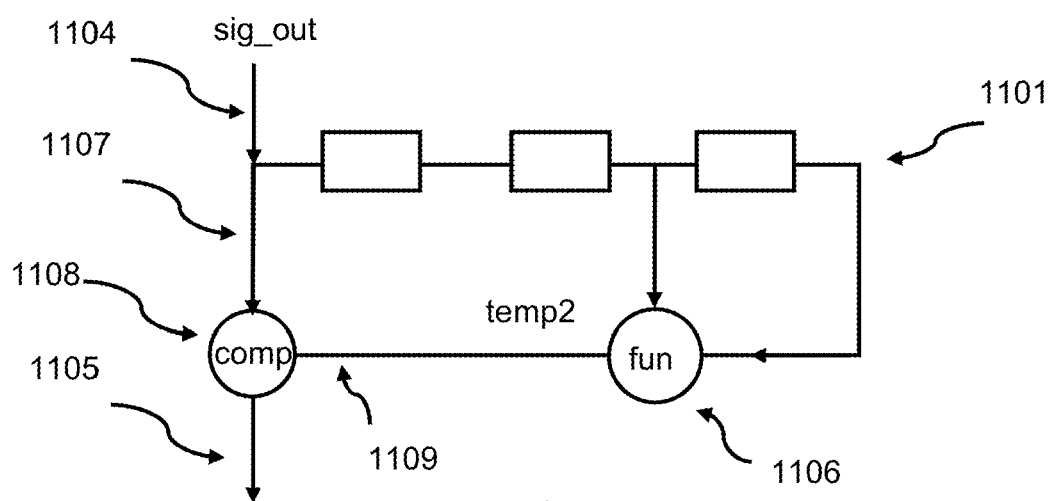
FIG. 11 is a diagram of the descrambler for the sequence generator of FIG. 10.

FIGS. 10 and 11 show in further detail how the descrambling of a sequence would work. Assume that a sequence was generated by circuit 1000 as shown in FIG. 10. When one applies the circuit 1001, inputting the sequence generated by 1000 on input 1004, and assuming the content of the shift register of 1001 is identical to the content of the shift register of 1000 when the symbol in the sequence was generated, then the symbols provided on input 1004 and generated on output 1005 are identical.

A descrambler or detector of the sequence generated by the circuit 1000 can be created by applying a logic function 'compt' which can have as its distinguishing property that its output is a certain value when the two input values are identical.

For example the ternary logic function comp can have the following truth table:

| compt | 0 | 1 | 2 |
|---|---|---|---|
| 0 | 1 | 0 | 2 |
| 1 | 2 | 1 | 0 |
| 2 | 0 | 2 | 1 |

When the two inputs to compt are equal the generated output will be 1. The detection of a sequence comprising all 1s, or having a large portion of 1s, is fairly easy to detect by calculating a digital sum, adding the total number of detected 1s. One can improve the performance by inserting a (scrambled) series of symbols which would indicate the start of an appropriate signal. One can also insert a small sequence at the end to indicate the end of a sequence. When insertion of those start/stop sequences is required one may consider using a scrambler with a particular input as the sequence generator.

The advantage of the method of descrambling a sequence is that no extensive synchronization mechanism is required. When the appropriate sequence enters the detector, a series of for instance 1s is generated. When the digital sum of the series of identical symbols (or 1s in this example) reaches a certain pre-determined value, one can be fairly certain that a qualified sequence was detected. This method is significantly simpler than determining a correlation, which requires first of all synchronization as well as availability of a local copy of the sequence to be detected. However, it should be evident that when a sequence is a accumulation of individual and orthogonal sequences, this method may not work.

By this method of detecting a sequence by way of descrambling, the problem of sequence availability has been changed into availability of unique scrambler configurations. For lower value logics, such as the ternary case, this may pose a problem when many different sequences are required. In that case the availability of attractive Gold sequences may be more advantageous than the ease of detection by descrambling. It should be recognized that the availability of ternary descrambling solutions increases with the degree (or the length) of the shift register. An indication of the availability of descrambling solutions may be the availability of primitive and irreducible polynomials. The number of primitive and/or irreducible polynomials over GF(n) with n being prime, can be determined on a popular website with URL: http://fchabaud.free.fr/English/default.php?COUNT=1&FILE0=Poly. For GF(3) with degree 4 there are 8 primitive polynomials. So at least 24 good descrambling solutions can be constructed. (Three per polynomial). This is taking into account that some solutions, while not detecting all is may generate an inverted version, for instance an all 2s sequence. More descrambling solutions of degree 4 can be created with somewhat lesser random properties. By doubling the number of elements in the shift register to 8 (or degree 8 in GF(3)) there are now 320 polynomials. For a 5-valued logic these numbers are: 150 polynomials of degree 4 over GF(5) and 48,750 polynomials of degree 8 over GF(5).

An additional advantage of using descrambling solutions for detecting sequences is the possibility to easily program user equipment for a specific sequence generator or sequence detector by descrambling. While it is also possible to already hard wire the specific solutions into user equipment it may be beneficial to assign certain sequences to certain channels depending on demand, location of the user related to the base station and congestion status of the network. The base station may then be given the ability to assign specific sequences and program user equipment for either generation or detection of sequences. The same is also possible for Gold sequences. However this will require other and perhaps more extensive efforts.

For illustrative purposes only the following computer script in the Matlab language shows how a descrambler can be programmed by transmitting a sequence called Info to the user equipment. It may be assumed for this purpose that the end user equipment applies a programmable processor that executes the Matlab script.

The vector Info contains the following (for illustrative purposes decimally coded) data elements:
1. deg=Info(1) (degree of the shift register)
2. taps=Info(2) (number of taps)
3. loc=Info(3:5) (location of the taps)
4. fun1=Info(6:14) (first ternary function)
5. fun2=Info(15:23) (second ternary function)
6. fun3=Info(24:32) (third ternary function)
7. comp=Info(33:41) (detection function)
8. init=Info(42:45) (initial content shift register)

Assume in this case that the degree will be 4 and that 2 taps will be connected (the first and the third) using the functions ter1 and ter2 as previously used and the detection function comp. The vector Info will then be:
Info=[4 2 1 0 1 3 1 2 2 3 1 1 2 3 1 2 3 1 2 3 1 2 3 1 2 3 3 1 2 2 3 1 2 1 3 3 2 1 1 3 2 2 1 1 3]

The script of the program is listed below:
% programmed ternary descrambler
Info=[4 2 1 0 1 3 1 2 2 3 1 1 2 3 1 2 3 1 2 3 1 2 3 1 2 3 3 1 2 2 3 1 2 1 3 3 2 1 1 3 2 2 1 1 3]
deg=Info(1)
taps=Info(2)
loc1=Info(3)
loc2=Info(4)
loc3=Info(5)
fun1=Info(6:14)
fun2=Info(15:23)

```
fun3=Info(24:32)
comp=Info(33:41)
shifts=[Info(42) Info(43) Info(44) Info(45)]
if deg~=4
'resend Info'
end
funt1=tot3(fun1);
funt2=tot3(fun2);
funt3=tot3(fun3);
compt=tot3(comp);
for i=1:80
in1=shifts(1);
in2=shifts(2);
in3=shifts(3);
in4=shifts(4);
temp1=funt3(in3,in4);
temp2=funt2(in2,temp1);
temp3=funt3(in1,temp2);
res(i)=compt(seq(i),temp3);
shifts(4)=shifts(3);
shifts(3)=shifts(2);
shifts(2)=shifts(1);
shifts(1)=seq(i)
end
res
```

The program uses origin 1. Consequently all functions apply origin 1 in their truth tables. The function funt2 should be considered as not connected to tap 2. Its truth table therefore is:

| funt2 | 0 | 1 | 2 |
|---|---|---|---|
| 0 | 0 | 1 | 2 |
| 1 | 0 | 1 | 2 |
| 2 | 0 | 1 | 2 |

Figure 12:
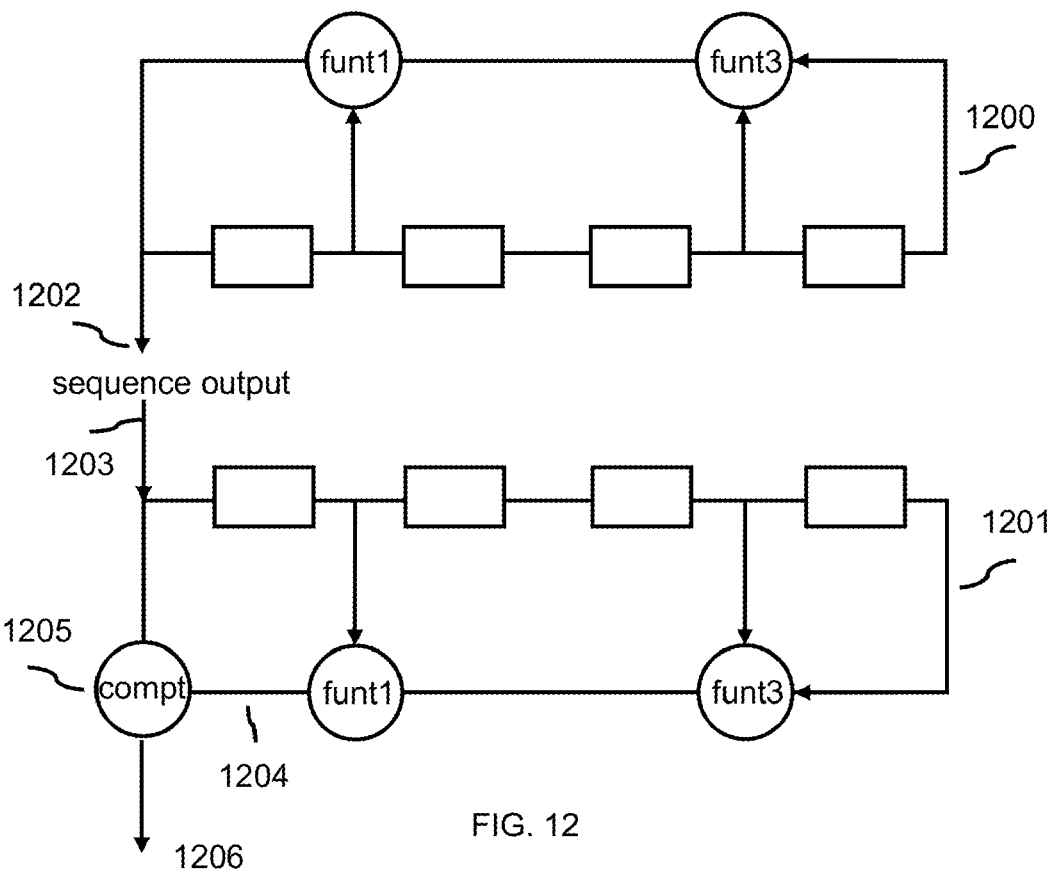
FIG. 12 shows an LFSR based sequence generator and its related descrambler.

The configuration, as realized by the program script, and the corresponding sequence generator are shown in FIG. 12. Circuit 1200 is the sequence generator, outputting a ternary sequence on output 1202. The descrambler realized and executed by the Matlab program is shown as circuit 1201. The sequence is inputted on input 1203. When the circuit 1201 receives the appropriate sequence (and with the correct content of the shift register) the signals on 1204 and 1203 will be identical. The device 1205, executing ternary function compt, will generate all 1s on its output 1206.

A communication system 200 can have a plurality of communication devices 202 to 206 in communication with a base station 201. Each communication device has sequences stored that are used to communicate with the base station 201. The sequences, including the cyclical variants thereof, can be generated by the circuit of FIG. 5 with the logic function ter1, by the circuit of FIG. 5 with the logic function ter2 and/or by the circuit of FIG. 5 with the logic function ter3. These sequences can either be stored in the communication devices 202 to 206 or can be generated by sequence generators in the communication devices 202 to 206.

This system can easily be extended to other multi-value sequences by changing the characteristics of the sequence generator, for example, by changing the length or the tap configuration. Any combination of sequences that can be generated by one or more sequence generators as illustrated in FIG. 5 that used either ter1, ter2, or ter3 can be used. In accordance with one embodiment of the present invention, sequences generated by three sequence generators, each using either ter1, ter2 or ter3, are used by a communication device 202 to 206. Alternatively, sequences that can be generated by sequence generators using the logic functions ter1 and ter2 can be used. Additionally, sequences that can be generated by sequence generators using logic functions ter1 and ter3. Further, sequences that can be generated by sequence generators using logic functions ter2 and ter3 can be used. Further, sequences that can be generated by a sequence generator using ter 1 or ter 2 or ter 3 can be used.

The 4-Valued Case.

The methods, according to several aspects of the present inventions, also apply to 4-valued sequence generators, and scramblers/descramblers. The number 4 is not a prime number and it will take additional efforts (usually through substitution methods), to establish the sequence generators based on Galois Field theory.

An alternative method being an aspect of this invention, used with good results, is to apply reversible 4-valued logic functions at different tap configurations in a computer program and determine its correlation properties. When a configuration generates a sequence with acceptable correlation properties, one can execute all 4-valued logic functions in such a configuration and select the functions that create acceptable sequences. This method circumvents the need for Galois Field theory, can be easily executed in a computer program and generates more sequences than with Galois Field theory.

Figure 13:
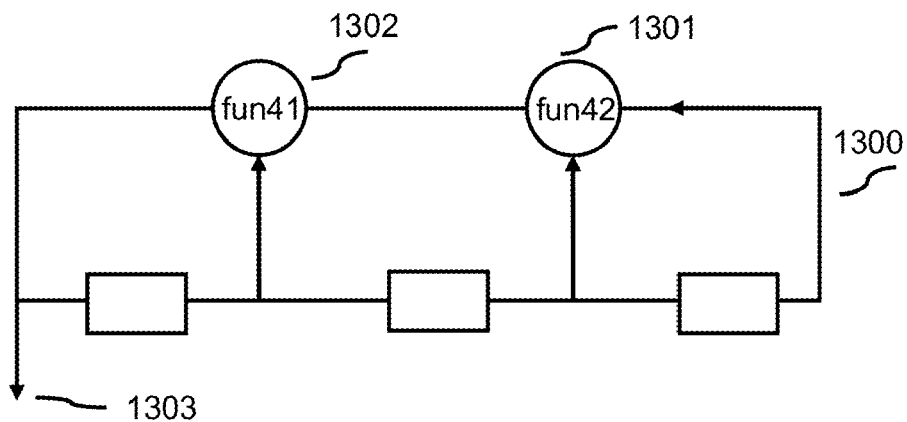
FIG. 13 is a diagram of a sequence generator.

An example of a 4-valued sequence generator is shown in FIG. 13 as circuit 1300, applying a 3 element 4-valued shift register and two 4-valued functions fun41 in device 1302 and fun42 in device 1301, outputting a 4-valued sequence on 1303. The truth tables of the functions fun41 and fun42 are shown in the following tables.

| fun41 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| fun42 | 0 | 1 | 2 | 3 |
|---|---|---|---|---|
| 0 | 0 | 1 | 3 | 2 |
| 1 | 1 | 0 | 2 | 3 |
| 2 | 2 | 3 | 1 | 0 |
| 3 | 3 | 2 | 0 | 1 |

This configuration generates a 4-valued m-sequence of length 63 elements. The sequence is shown in the following table:

| 4-valued m-sequence: sm4 | 213300310222122032320103322302111011231312023311321000200130301 |
|---|---|

As before, other cyclically related sequences are also generated.

Many more 4-valued m-sequences and 4-valued sequences with good correlation properties can be created using LFSR based sequence generators and 4-valued logic functions, wherein not all are modulo-4 addition functions and no multipliers are used.

Examples of sequences with good correlation properties, generated according to one method of this invention are shown in the following table:

| | | In2 | |
|---|---|---|---|
| In1 | 0 | 1 | 2 |
| 0 | 0 | 1 | 2 |
| 1 | 2 | 0 | 1 |
| 2 | 1 | 2 | 0 |

| | |
|---|---|
| seq41 | 21132031300202123120111221033311023223022200101310030323213301 |
| seq42 | 00212210222003131012013000110323312112311133020232132033223010 |
| seq43 | 21132332133311020212312011122103002322302220013130320310033012 |
| seq44 | 10302111331020120221010003320322303122200231321311232333013011 |

Figure 14:
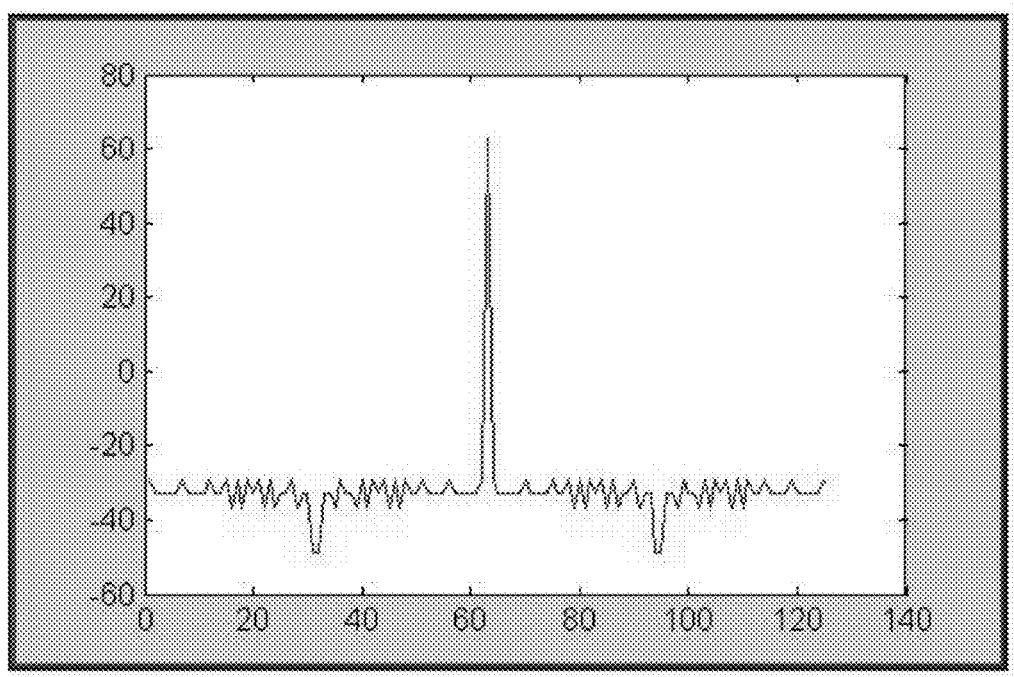
FIG. 14 is an auto-correlation graph for a 4-valued sequence.

The 4 sequences shown in the table are 4 of a set of 48 different sequences created by a 3 element 4-valued LFSR with one feedback tap, wherein each sequence was generated by a generator with a different 4-valued function in the feedback tap. FIG. 14 shows the auto-correlation graph of sequence seq44. All sequences were selected with as criterion that the difference between the highest and second highest correlation value was at least 80.

Figure 15:
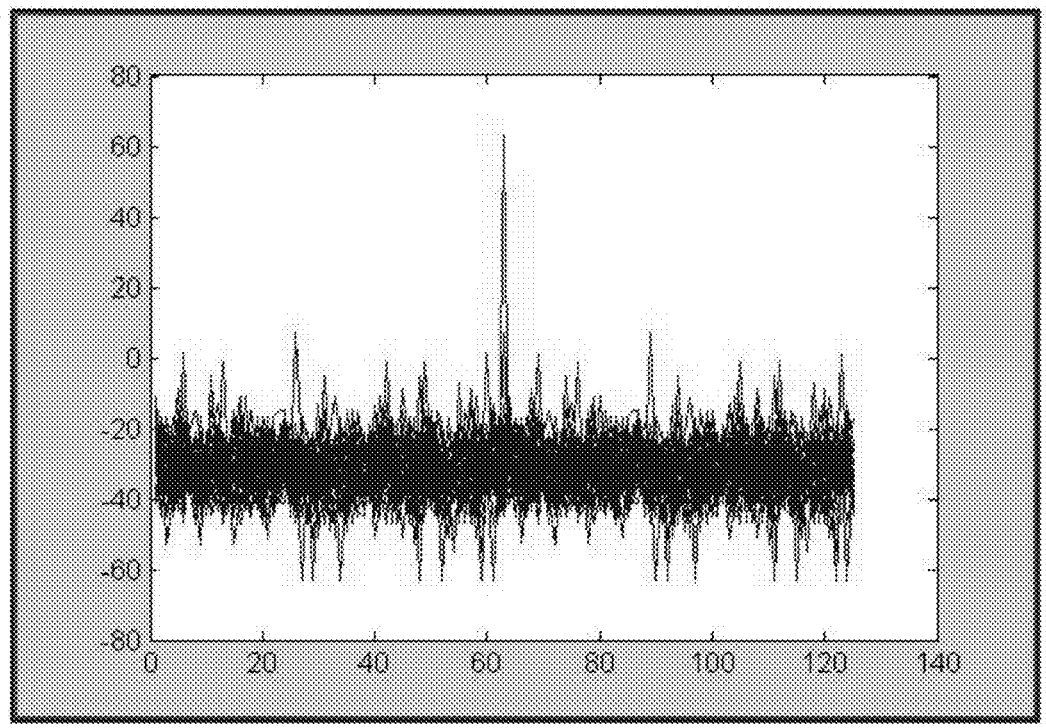
FIG. 15 is an overlay graph of the auto-correlation and cross correlation of 4-valued sequences generated by LFSR based sequence generators.

FIG. 15 shows the overlay of the cross-correlation between 40 of these sequences. The peak is the auto-correlation between two identical sequences. The cross-correlation is at least 55 below the auto-correlation peak.

A Communication System Using Ternary Sequences

In accordance with one aspect of the present invention, a communication system is provided. The communication system has a base station and a plurality of communication devices. Each of the communication devices communicates with the base station using at least one of a first plurality of sequences comprised of ternary signals, the first plurality of sequences being able to be generated by the previously described sequence generator that uses the ternary function set forth below.

| | | In2 | |
|---|---|---|---|
| In1 | 0 | 1 | 2 |
| 0 | 1 | 2 | 0 |
| 1 | 0 | 1 | 2 |
| 2 | 2 | 0 | 1 |

The sequences are either generated by previously described sequence generator located on the communication device or they can be first generated by the previously described sequence generator and then stored in memory on the communication device.

The previously described communication device can also communicate with the base station using at least one of a second plurality of sequences comprised of ternary signals, the second plurality of sequences being able to be generated by a sequence generator that uses the ternary function set forth below.

Once again the second plurality of sequences is either generated by a second sequence generator located on the communication device or can be stored in memory on the communication device.

The communication devices can also use a different second plurality of sequences that are able to be generated by a sequence generator that uses the ternary function set forth below.

| | | In2 | |
|---|---|---|---|
| In1 | 0 | 1 | 2 |
| 0 | 2 | 0 | 1 |
| 1 | 1 | 2 | 0 |
| 2 | 0 | 1 | 2 |

Once again the second plurality of sequences is either generated by a second sequence generator located on the communication device or can be stored in memory on the communication device.

The communication system can also use all three of the previously described sequence generators to generate three plurality of sequences that are used by communication devices to communicate with the base station.

In accordance with another aspect of the present invention, another communication system can be provided where the communication devices can communicate with the base station using at least one of a first plurality of sequences comprised of ternary signals, the first plurality of sequences being able to be generated by a sequence generator that uses the ternary function set forth below.

| | | In2 | |
|---|---|---|---|
| In1 | 0 | 1 | 2 |
| 0 | 2 | 0 | 1 |
| 1 | 1 | 2 | 0 |
| 2 | 0 | 1 | 2 |

Further, the communication system described in the previous paragraph can provide communication devices that can communicate with the base station using at least one of a second plurality of sequences comprised of ternary signals, the second plurality of sequences being able to be generated by a sequence generator that uses the ternary function set forth below.

| | | In2 | |
|---|---|---|---|
| In1 | 0 | 1 | 2 |
| 0 | 0 | 1 | 2 |
| 1 | 2 | 0 | 1 |
| 2 | 1 | 2 | 0 |

4-Valued Gold Sequences.

The previous sequences are not Gold sequences, but were created by a single LFSR based sequence generator. According to one aspect of this invention it is possible to create 4-valued Gold sequences by combining the output of 2 LFSR based 4-valued sequence generators through a 4-valued logic function, wherein not all applied 4-valued functions are modulo-4 adders and no multipliers are used.

As an illustrative example a series of 63 4-valued sequences of length 63 can be generated by using a 4-valued function fun44 to combine the 4-valued sequence seq44 and the 4-valued m-sequence sm4 shown in previous tables and by repeating the process for a shifted version of sequence seq44. The truth table of 4-valued function fun44 is shown in the following table:

| fun44 | 0 | 1 | 2 | 3 |
|---|---|---|---|---|
| 0 | 1 | 0 | 2 | 3 |
| 1 | 2 | 3 | 1 | 0 |
| 2 | 3 | 2 | 0 | 1 |
| 3 | 0 | 1 | 3 | 2 |

Figure 16:
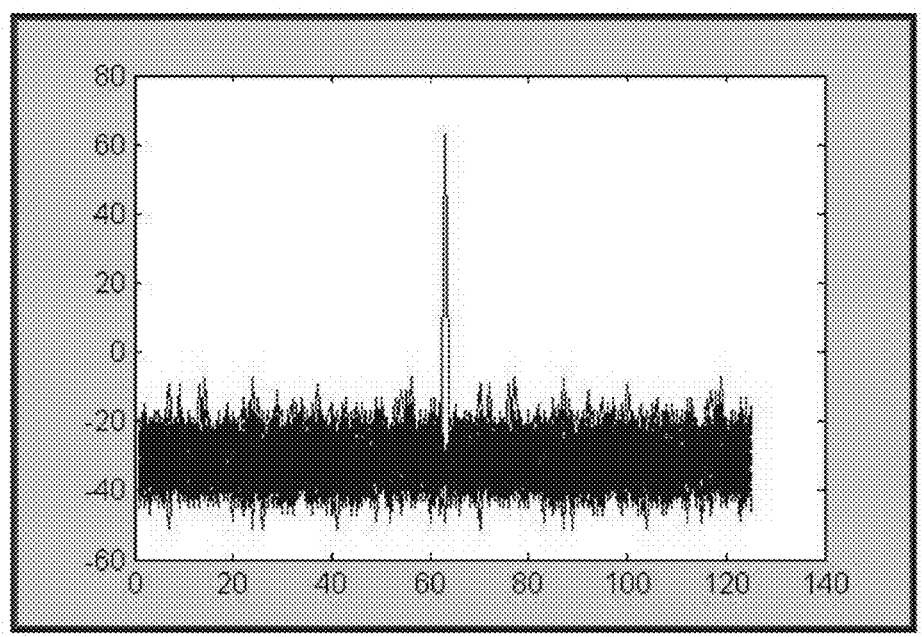
FIG. 16 is an overlay graph of the auto-correlation and cross correlation of 4-valued Gold sequences.

FIG. 16 shows the correlation of one of the thus generated Gold sequences with the 63 sequences. The peak shows the auto-correlation for the selected reference sequence. The cross-correlation of these sequences is somewhat, but still noticeably better than the cross-correlation of the cross-correlation shown in FIG. 15.

According to one aspect of the present invention all possible reversible 4-valued logic functions can be used to combine two 4-valued sequences. Many of the generated 4-valued sequences, created by combining two 4-valued sequences through a 4-valued reversible logic function, not being the modulo-4 addition, will show attractive or adequate correlation properties. A computer program can be used to generate and select the 4-valued combined sequences based on pre-determined correlation criteria. When the cross-correlations between these sequences, created by combining two 4-valued sequences, assume values within a limited range, and the individual auto-correlations show a significant single peak value compared to the rest of the correlation values, the sequences may be considered 4-valued Gold sequences. It should be clear that a significant number of different 4-valued Gold sequences can be generated according to the method here provided.

A publication regarding 4-valued Gold sequences is a Ph. D. thesis by Derek Paul Rogers, submitted at the Faculty of Engineering of the University of Adelaide in March 1995, entitled: Non-binary spread-spectrum multiple-access communications. This publication was found and downloaded from the WWW on Feb. 16, 2005. The thesis is mainly concerned with 4-valued Gold sequences. However it applies combinations of (what the author calls) adding and multiplication functions and is thus different from the method here invented applying single combining functions.

Detection of 4-Valued Sequences by Descrambling.

According to one aspect of the present invention it is possible to detect 4-valued sequences, generated by 4-valued based LFSR sequence generators by applying a descrambler, of which the structure is the same as the sequence generator. However, where in the sequence generator the output of the last (or if applicable: the only) logic function is inputted to the first element of the shift register, the output of such logic function is in the descrambler inputted to a first input of a descrambling logic function. The to be descrambled sequence is inputted to a second input of the descrambling function and to the first element of the shift register of the descrambler. The truth table of the descrambling function should be such that when equal symbols are provided to its inputs the descrambling function should generate one value. One example is shown in the following table:

| fundes | 0 | 1 | 2 | 3 |
|---|---|---|---|---|
| 0 | 1 | 0 | 2 | 3 |
| 1 | 2 | 1 | 3 | 0 |
| 2 | 3 | 2 | 1 | 2 |
| 3 | 0 | 3 | 0 | 1 |

In the example when the two inputs are equal the function fundes will generate as output the value 1. One can adapt the function to the requirements of a system.

Like in the ternary case, it is possible in a non-orthogonal situation to use 4-valued sequences generated by LFSR based sequence generators and perform detection based on descramblers and a criterion based detector such as a digital sum comparator. While the correlation performance of these sequences may be slightly less than for instance certain Gold sequences, their operations are much simpler than correlation based detectors. It should be clear that additional information (like start/stop patterns) can be attached to sequences. When that is required it may be beneficial to apply an LFSR based scrambler as a sequence generator.

Programmable 4-Valued Detectors and Generators.

According to one aspect of the present invention it is possible to assign additional sequences to certain users in a communication system as shown in FIG. 2. It is also possible for a base station to select the most suitable and available sequences, their method of generation and detection. It is then possible for the base station to send enabling information to individual user equipment within the system, which will program that equipment to generate and detect sequences.

N-Valued Sequences and Gold Sequences.

It should be clear that the methods of the present inventions as they apply to ternary and 4-valued sequence generators, Gold-sequence generators and descramblers also apply to n-valued sequence generators, Gold sequence generators and descramblers, wherein n is an integer greater than 4. With greater values of n (5 and higher) the number of n-valued reversible inverters will be greater. An n-valued logic has n! reversible inverters. The number of reversible scrambling functions grows exponentially with greater values of n. As shown in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA, the correlation performance of n-valued sequences improves when n has greater values. There will in general not be a problem of availability of n-valued sequences, sequence generators, scramblers or descramblers. Computer programs may be used to create, test and select sequences, sequence generators, Gold sequence generators and descramblers.

In accordance with one aspect of the present invention, apparatus for generating sequences of ternary signals that can assume one of three states is provided. The apparatus includes a first sequence generator that can generate a first sequence of ternary signals that can assume one of 3 states on an output of the first sequence generator, a second sequence generator that can generate a second sequence of ternary signals that can assume one of 3 states on an output of the second sequence generator; and a first ternary logic device having a first input connected to the output of the first sequence generator, having a second input connected to the output of the second sequence generator and having an output. A ternary sequence appears on the output of the first ternary logic device.

In accordance with another aspect of the present invention, the ternary logic device has an output and a third sequence of ternary signals appears on the output of the ternary logic device when the first sequence generator outputs the first sequence of ternary signals and when the second sequence generator outputs the second sequence of ternary signals.

In accordance with another aspect of the present invention, the ternary logic device executes a ternary logic function defined by a truth table where each of its columns is a ternary reversible inverter, but not a modulo-3 adder.

In accordance with another aspect of the present invention, the first sequence generator includes a first multi-element shift register and at least one ternary reversible logic device or function, not being the modulo-3 adder and has no multipliers.

In accordance with another aspect of the present invention, the first sequence generator generates a ternary sequence, which can be characterized by:

a polynomial of degree p (with p being 2 or greater) and k (with k not greater than p−1) coefficients not equal to 0;

the length of the sequence being $3^p-1$ ternary elements;

the auto-correlation, being the correlations over $2*3^p-1$ positions between the sequence and its phase shifted versions shows one large absolute peak value at the coinciding phase of the sequence and its phase shifted version and is lower at all other positions.

In accordance with another aspect of the present invention, the second sequence generator includes a second multi-element shift register.

In accordance with another aspect of the present invention, the second sequence generator generates a ternary sequence, which can be characterized by:

a polynomial of degree p (with p being 2 or greater) and k (with k not greater than p−1) coefficients not equal to 0;

wherein p has the same value as before and the coefficients of the irreducible polynomials are not identical to the ones before;

the length of the sequence being $3^p-1$ ternary elements;

the auto-correlation, being the correlations over $2*3^p-1$ positions between the sequence and its phase shifted versions shows one large absolute peak value at the coinciding phase of the sequence and its phase shifted version and is predominantly constant at all other positions.

In accordance with another aspect of the present invention, apparatus for generating a set of sequences of ternary signals that can assume one of three states, is provided. The apparatus includes a first sequence generator that can generate a first sequence of ternary signals that can assume one of 3 states on an output of the first sequence generator; a second sequence generator that can generate a set of $3^p-1$ different but related second sequences of ternary signals that can assume one of 3 states on an output of the second sequence generator wherein each different sequence is formed by phase shifting each element of the previous sequence by one position in a circular fashion; a first ternary logic device having a first input connected to the output of the first sequence generator and a second input connected to the output of the second sequence generator.

A set of $3^p-1$ different ternary Gold sequences is generated on an output of the first ternary logic device, the set of ternary Gold sequences characterized by: an auto-correlation with a single peak value on the coinciding phase of the correlation between the generated ternary sequence and a phase shifted copy of itself and a correlation value that is limited to a much lower maximum and minimum value in all other phases and a cross-correlation value between each of the generated sequences that is limited to a maximum and minimum value that is much lower than the peak value of the auto-correlation of each individual sequence.

In accordance with another aspect of the present invention, the first ternary sequence generator in the above apparatus generates a sequence and the second ternary sequence generator generates a set of $3^p-1$ different ternary sequences with $3^p-1$ ternary elements by phase shifting each element of the sequence at least one position in a circular fashion and the output of the ternary logic device creates a ternary sequence characterized by having a length of $3^p-1$ ternary elements.

In accordance with another aspect of the present invention, a method for generating sequences of multi-valued signals that can assume one of x states, x being greater than or equal to three, is provided. The method includes generating a first sequence of multi-valued signals that can assume one of x states; generating a second sequence of multi-valued signals that can assume one of x states; and inputting the first sequence of multi-valued signals and the second sequence of multi-valued signals to a first multi-valued logic device, the device not being a modulo-x adder.

The method further includes outputting a third sequence of multi-valued signals on the output of the multi-valued logic device.

In the method, the step of generating a first sequence of multi-valued signals is performed using a first multi-element shift register. The step of generating a second sequence of multi-valued signals is performed using a second multi-element shift register.

In accordance with another aspect of the present invention, the step of generating a first sequence of multi-valued signals is performed using a first multi-element shift register and at least a second multi-valued logic device that implements a second multi-valued logic function. Also, the step of generating a second sequence of multi-valued signals is performed using a second multi-element shift register and at least a third multi-valued logic device that implements a third multi-valued logic function.

In accordance with another aspect of the present invention, the third sequence of multi-valued signals is a Gold sequence.

It has been shown that the benefits of assigning additional sequences to a single user depend among others on the cost of realizing and utilizing the additional sequences. It has been shown that at a certain number of symbol-levels or number of sequences it may be more cost effective to create another channel or apply additional carriers.

As described above, based on an aspect of an invention as described in U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA (the '645 application'), one may create a modified correlation calculation based on increasing a correlation number when two corresponding symbols in two sequences are identical. One may further decrease the correlation number when two symbols are not equal. This approach is clearly reflected in FIGS. 4 and 8. FIG. 4 shows a simplified correlation graph of a ternary m-sequence: a single peak and all other correlation values being identical. A similar simplification is shown in FIG. 8. The simplification is demonstrated by the lack of side-lobes or sub-peaks in the correlation graph, which ordinarily would appear in any correlation of m-sequences of n-state symbols. It is known, and it was shown in the '645' application that the standard way of calculating a correlation involves a multiplication and a summation, as seen in the correlation formulas:

$$K_{FF}(\theta_v) = \lim_{\theta \to \infty} \frac{1}{\theta} \int_{-\frac{\theta}{2}}^{\frac{\theta}{2}} F(\theta) F(\theta + \theta_v) d\theta$$

for the analog auto-correlation case
and, $$C(j) = \frac{1}{N} \sum_{i=1}^{N} a_i a_{i+j}$$

for the discrete auto-correlation, and $$C(j) = \frac{1}{N} \sum_{i=1}^{N} a_i b_{i+j}$$

for the discrete cross-correlation.
Different Forms are Known, but all Have Similar Multiplication and Summation Steps.

Figure 17:
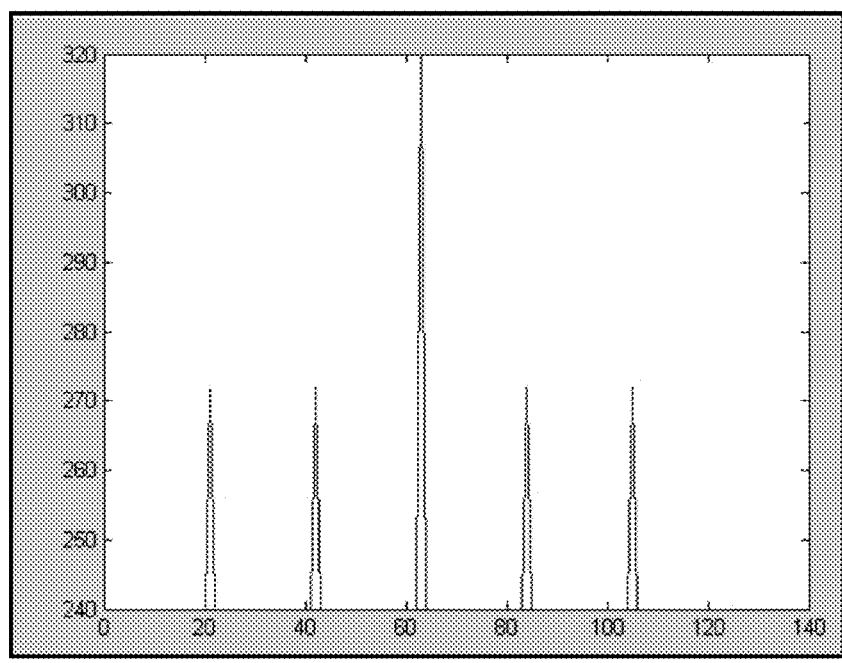
FIGS. 17-19 are correlation graphs in accordance with one or more aspects of the present invention.

The effect of determining a correlation based on the standard method, involving multiplication and summation, for sequences of higher valued symbols is shown in FIG. 17. This is a correlation graph generated from a 4-state m-sequence of 63 n-state symbols. One can clearly see the single peak and the four side peaks. The peak value is 320 in this case. One may of course manage the correlation values by the assignment of values to the different n-state symbols. For instance, one may assign positive and negative values for instance [0 1 2 3]=[−2 −1 1 2]. While this brings down the correlation curve relative to the 0-axis, it leaves the shape of the correlation curve unchanged.

Figure 18:
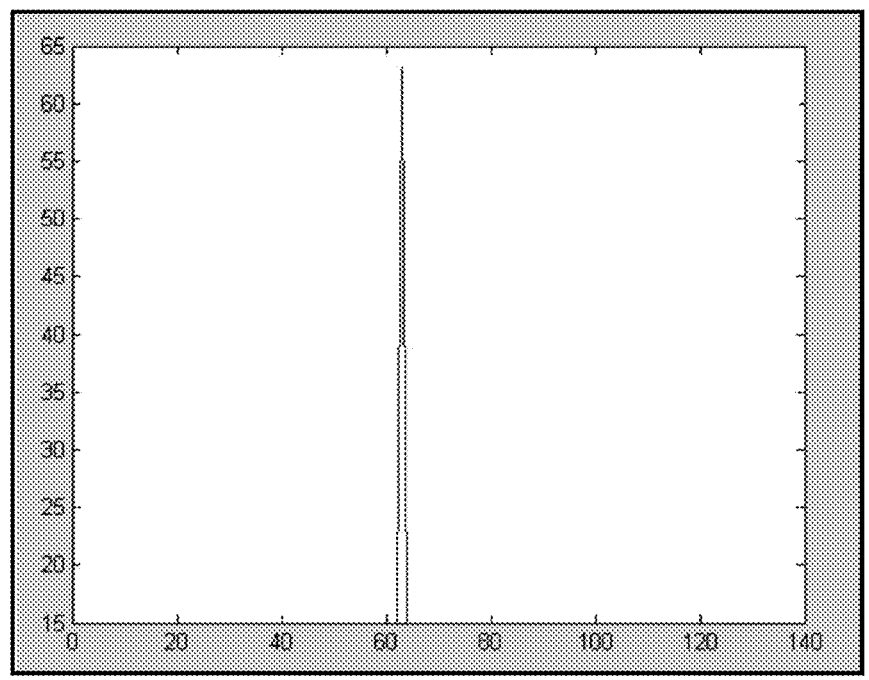
Figure 19:
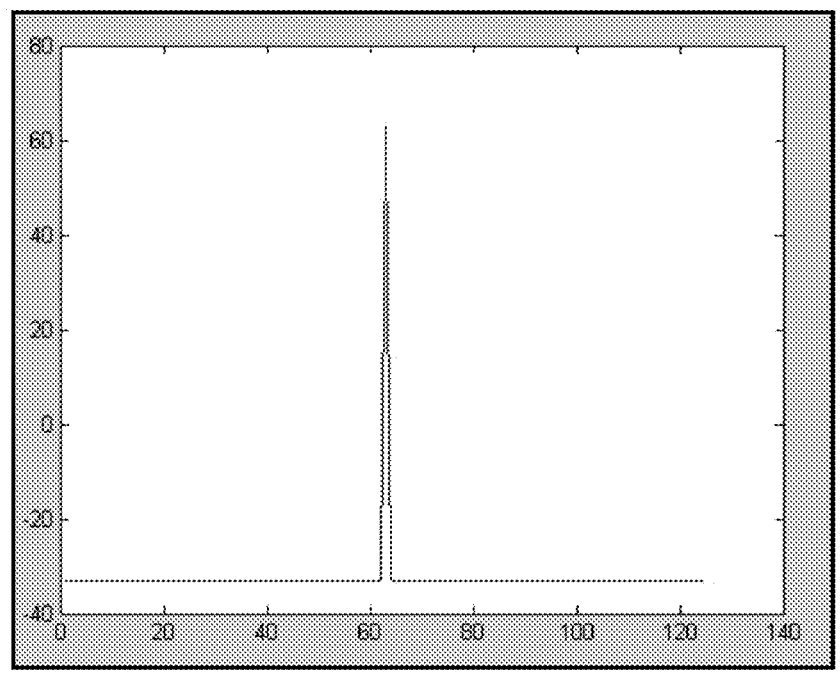

FIGS. 18 and 19 show the auto-correlation curves by applying the above method of calculation. In the case of FIG. 18 a 1 is added to a sum when the corresponding symbols in two sequences are identical. FIG. 19 is created by also subtracting 1 when two corresponding symbols are not identical. One may of course add or subtract other numbers. The shape of the curve is attractive as no side peaks will be created. This approach applied to for instance sequences of ternary symbols also will create the same type of curve for ternary m-sequences. The same applies for all n-state m-sequences with n>2. This way of determining correlation is applied throughout the specification.

Figure 20:
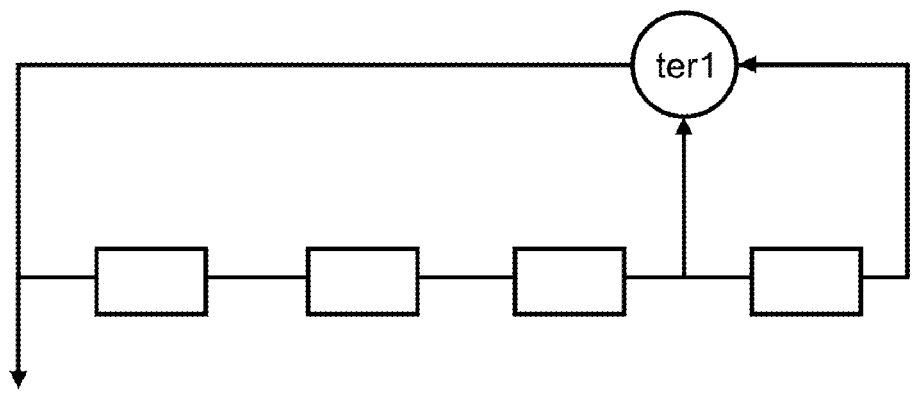
FIG. 20 is a diagram of a sequence generator in accordance with an aspect of the present invention.
Figure 21:
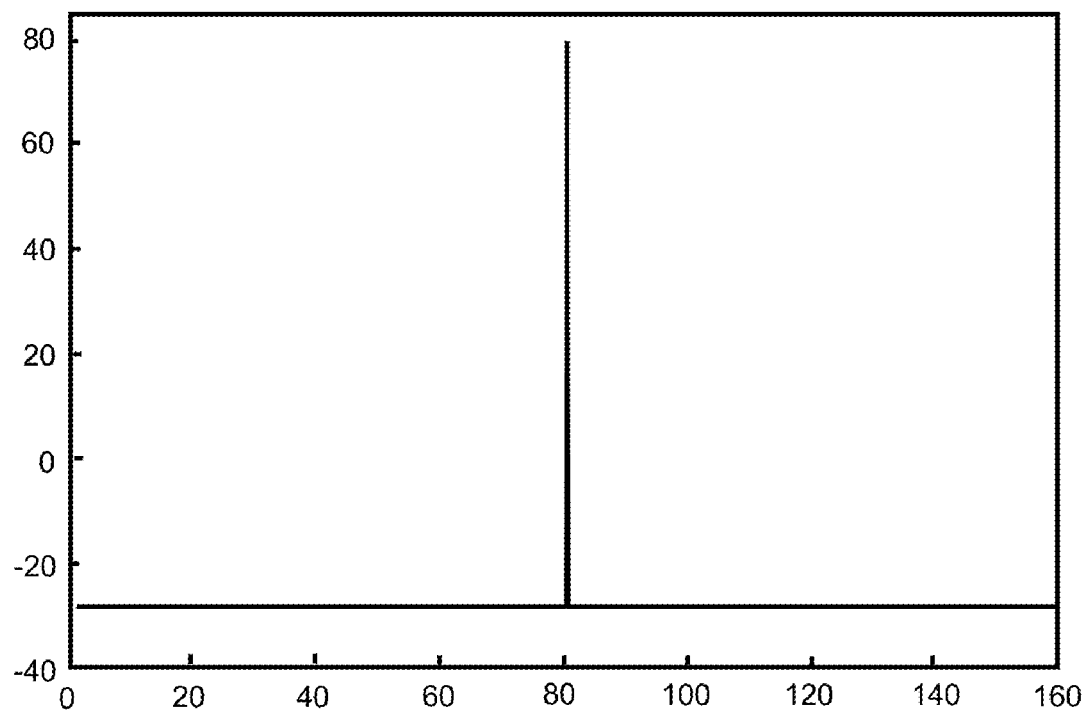
FIG. 21 is another correlation graph in accordance with an aspect of the present invention.

This aspect is further illustrated in FIGS. 20-21 which are identical to FIGS. 4 and 5 of the "645' application. FIG. 21 shows a correlation graph for the ternary m-sequence of 80 ternary symbols outputted on 2002 in FIG. 20. The correlation rule used here is add 1 when symbols are identical and subtract 1 when symbols are not equal. The sequence genera- tor of FIG. 20 uses a ternary function 'ter1' of which the truth table is provided in the following table.

| ter1 | 0 | 1 | 2 |
|---|---|---|---|
| 0 | 1 | 2 | 0 |
| 1 | 0 | 1 | 2 |
| 2 | 2 | 0 | 1 |

Figure 6:
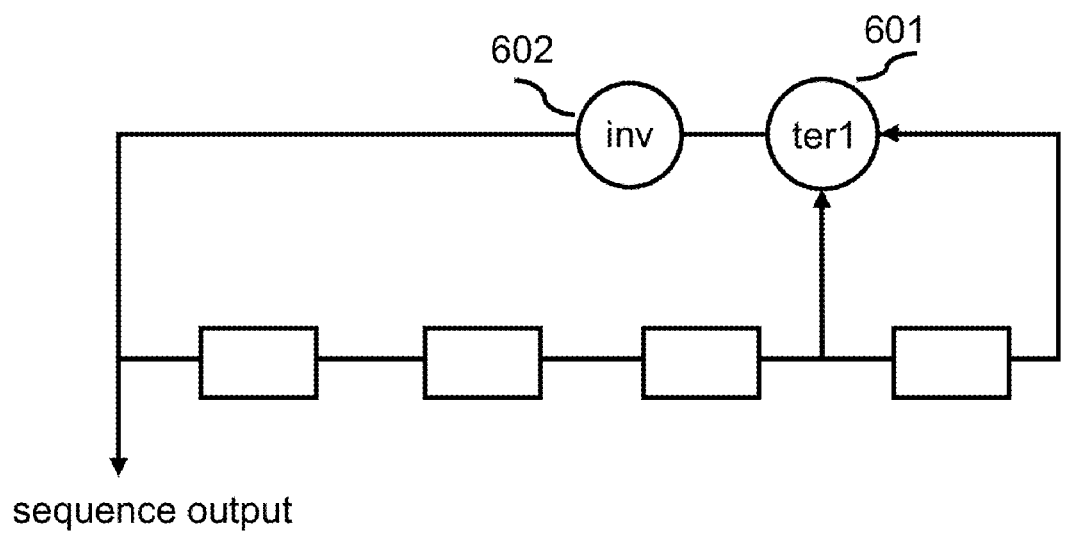
FIG. 6 is a diagram of an LFSR based sequence generator.
Figure 22:
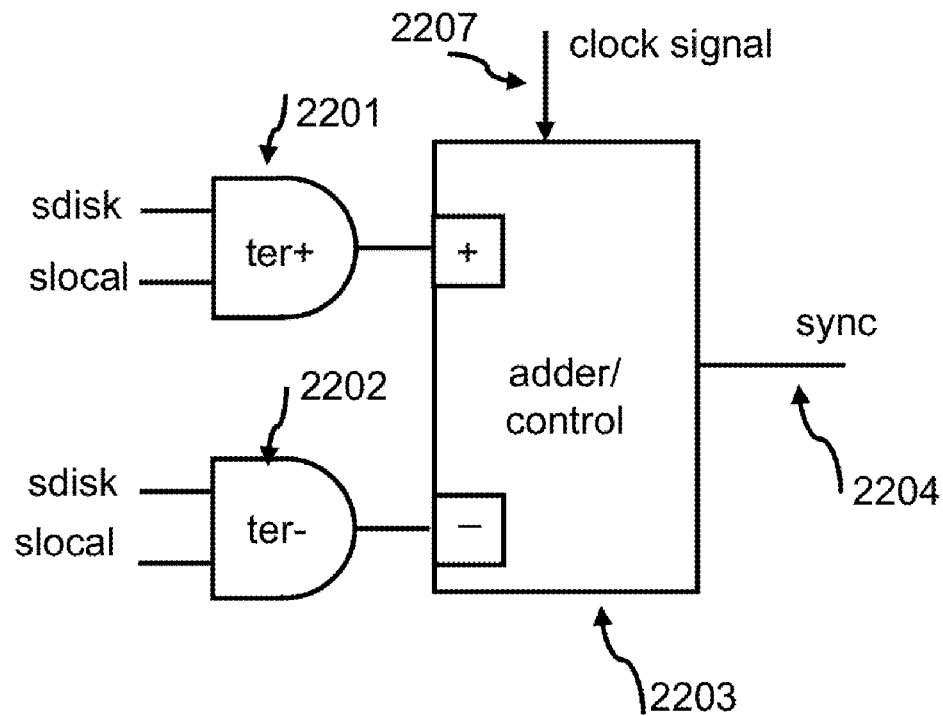
FIG. 22 is a diagram of a device to determine a correlation value in accordance with an aspect of the present invention.

The diagram of FIG. 22 which is identical to FIG. 6 of the '645' application, shows a diagram of a synchronization circuit that applies the described correlation method for an optical disk that has some n-state synchronization sequence 'sdisk' stored on it. Locally the n-state sequence of n-state symbols 'slocal' is generated and is compared in 2201 to determine if a synchronization point is detected. The device 2201 with function 'ter+' may generate a 1 on its output when symbols in 'sdisk' and 'slocal' provided each on an input are equal. One may call this a confirmation signal that confirms that two n-state symbols are identical. It will generate a 0 or no signal when 'sdisk' and 'slocal' are not identical. The device 2202 with function 'ter−' will generate a 1 on its output or a signal that confirms that two symbols are different when symbols in 'sdisk' and 'slocal' each provided on an input are not equal. It will generate a 0 or no signal when sdisk and 'slocal' are identical. The outputs of 2201 and 2202 will thus each provide a 0 or 1 (or an equivalent confirmation signal) to the adder control unit 2203, which will add the 1 or another fixed value to the total sum or subtract a fixed value on the basis of a signal coming from 2202 from the total sum. The add/subtract unit may be controlled by a clock signal 2207. Every clock cycle the new sum is calculated and outputted on output 2204, which is also input to a decision circuit (not shown). The decision circuit decides whether synchronization is detected. For example, the decision circuit may decide that synch is detected when the sum generated from the signal from the disk and a local signal exceeds a threshold. A reset signal (not shown) will reset the sum when a decision is made. The reset signal is generated after a certain number of clock cycles or after a certain amount of time.

One may use n-state signals or binary signals to operate the device of FIG. 22. It is possible to use the confirmation signal as an input to adder or subtractor. One may also have the confirmation signal trigger a fixed value to be added. For instance one may add 2 or 4 or any other power of 2 to a sum. This fixed value may be different from the subtracted value. The significance of the two different fixed values becomes clear at the moment of adding sum and difference.

One disadvantage of the standard correlation method is that with increasing values of n more side peaks will be created in the standard correlation curve. This may provide a barrier to search for m-sequences from a set of m-sequences. Additionally the standard correlation method requires multiplication and addition which may lead to very large numbers. In general, one applies some design criterion, usually a primitive polynomial over GF(n), to create an LFSR for generating an n-state m-sequence. A severe limitation herein is the use of multipliers $g_i$ which are defined over GF(n). A multiplier over GF(n) necessarily always has the limitation that a symbol 0 multiplied by a multiplier over GF(n) will always generate symbol 0. The inventor has shown, for instance in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS (the '960' application), that one may use other n-state inverters, which are not multipliers, to generate a sequence. One would like an n-state neutral method to determine if a sequence is an m-sequence. Clearly, the herein disclosed correlation method serves this purpose, as was shown above, as the correlation curve has this single peak appearance for any n-state m-sequence generated by an n-state LFSR with p shift register elements. The m-sequence then has $n^p-1$ symbols, and the auto-correlation graph is created from $2*n^p-1$ correlation values of which 1 has a peak value and the other correlation values are identical, but different from the peak value.

A modified correlation value can easily be determined. For instance in Matlab script two sequences 'aa' and 'bb' each having p n-state symbols will generate a correlation value 'cor' by: corplus=sum (aa==bb). The subtraction part can be created from cormin=sum (aa~=bb) and cor=corplus−cormin, which is implemented in FIG. 22.

The modified correlation method, used on a computer, has been applied to create the sequences as disclosed herein. It should be clear that the standard correlation method is not as easy to apply. Later, 8-state m-sequences will be disclosed, which will be checked by using the modified correlation method. It may be more difficult to determine from a standard correlation graph if for instance an 8-state sequence (or any n-state sequence with n>2) generated by a sequence generator is an m-sequence, whereas it is very easy to determine with the provided modified correlation method to determine if an n-state sequence is an m-sequence. Once correlation properties are determined one can of course store the sequence or the structure of a sequence generator without revealing that the correlation method was used. A fairly simple method to determine if an n-state sequence from the standard correlation will also be provided.

Another beneficial aspect of using the modified correlation method is as was described above, for determining synchronization against a second sequence. Detection of synchronization with the standard correlation method can be severely affected by the side-lobes or side peaks of the correlation graph. Under certain noise conditions, with incorrectly detected symbols the correlation value of the main peak may come down and those of the side peaks may go up. This has the negative effect that the chance to synchronize on a side peak increases. In the modified correlation method the distance (which one may call the detection distance) between synchronized and non-synchronized state is much greater and the chance of incorrectly synchronizing is much smaller.

Figure 23:
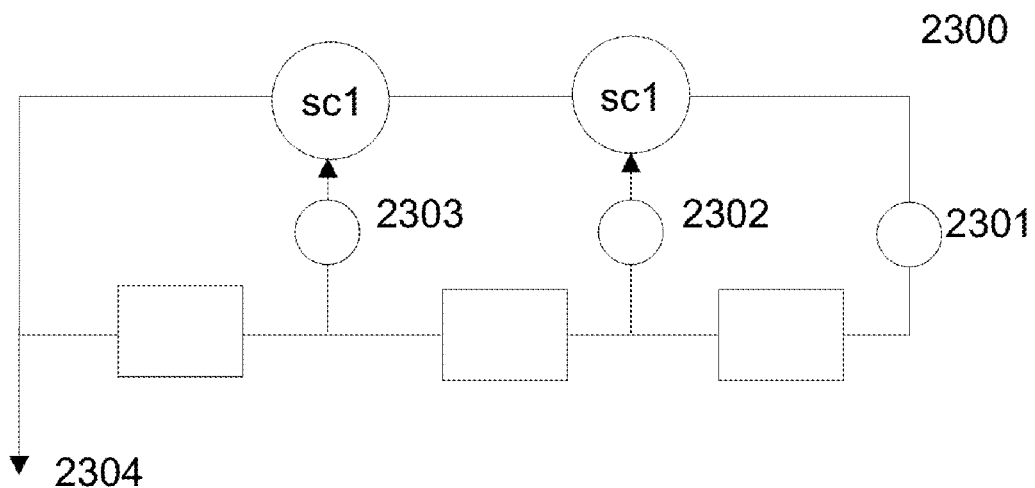
FIG. 23 is another diagram of a sequence generator in accordance with an aspect of the present invention.

FIG. 23 shows a diagram of a 4-state LFSR based m-sequence generator 2300. The LFSR has 3 shift register elements, each element enabled to hold a 4-state symbol or a binary equivalence thereof. The LFSR has 2 taps from the first and the second shift register element to an implementation of 4-state logic function sc1, which is the addition over GF(4) of which the truth table is provided in the following table.

| sc1 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

The 4-state symbols, represented by a signal, are outputted on output 2304. As before, a clock signal controls the shift register. This clock signal is assumed but not shown.

The taps have the inverters 2301, 2302 and 2303. The inverter 2301 is the 4-state inverter [0 1 2 3]→[2 1 3 0]. The inverter 2302 is [0 1 2 3]→[0 1 2 3], which is a straight through connection, which may be called the identity inverter. The inverter 2303 is also the identity inverter. Clearly, inverter 2301 is not a multiplier over GF(4) and the sequence generator of FIG. 23 is believed to be novel over existing art.

In view of the diagram, the sequence generator can be implemented by using two devices implementing the functions 'sc1' and one of these devices having a device implementing inverter 2301 at one of its inputs. It was shown in the '960' application that one may move an inverter at an input of an n-state logic function into the truth table. In that case the function 'sc1' with inverters 2301 and 2302 at its inputs may be modified into a device that implements 'sc2' with no inverters at its inputs. Assuming that inverter 2301 determines the columns of a truth table then the following table provides the truth table of non-commutative n-state logic function sc2.

| sc1 | 0 | 1 | 2 | 3 |
|---|---|---|---|---|
| 0 | 2 | 1 | 3 | 0 |
| 1 | 3 | 0 | 2 | 1 |
| 2 | 0 | 3 | 1 | 2 |
| 3 | 1 | 2 | 0 | 3 |

One can create a second n-state generator as shown in FIG. 23 with inverter 2301 is [0 1 2 3]→[2 1 3 0], 2302 is the identity inverter and 2303 is [0 1 2 3]→[0 2 3 1], to generate a 4-state m-sequence of 63 symbols on 2304.

Figure 24:
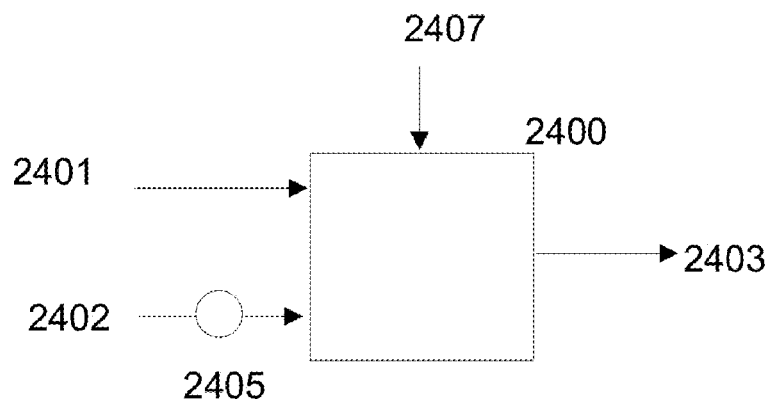
FIG. 24 is a diagram of a device to combine symbols of different sequences generator in accordance with an aspect of the present invention.

One may combine the symbols as generated by the sequence generator of FIG. 23 with the symbols as generated by the second sequence generator by the circuit 2400 of which a diagram is shown in FIG. 24. This device has inputs 2401 and 2402 and an inverter 2405 is positioned at input 2402. The circuit may be provided with a clock signal on 2407. A Gold sequence is provided on output 2403. The symbols may be combined by a device implementing an addition over GF(4) and the inverter being an identity inverter. The circuit will also generate a Gold sequence when inverter 2405 is inverter [0 1 2 3]→[2 1 3 0]. Other inverters will also work. When the inverter 2405 is a not the identity inverter, one may replace the implementation of the addition over GF(4) and the inverter with an implementation of a non-commutative 4-state function with no inverter at an input.

One may create a set of Gold sequences by using for each to be generated combined sequence the generator of FIG. 23, but by initiating the shift register with a different initial state for each combined sequence.

One may generate a set of Gold sequences and determine a modified correlation in accordance with the modified correlation method. As an illustrative example a first 4-state LFSR based generator is used as shown in FIG. 23 with inverter 2303 being [0 1 2 3]→[0 1 2 3]; inverter 2302 being [0 1 2 3]→[1 2 0 3]; and inverter 2301 being [0 1 2 3]→[3 1 0 2]. A second 4-state generator as shown in FIG. 23 is determined by inverter 2303 being [0 1 2 3]→[0 2 3 1]; inverter 2302 being [0 1 2 3]→[1 2 0 3]; and inverter 2301 being [0 1 2 3]→[0 2 3 1]. One can then use the second sequence generator with different initial shift register content to generate different (shifted) sequences and combine the symbols of the thus generated sequence with the symbols of the sequence generated by the first sequence generator. Combining may take place with a circuit such as shown in FIG. 24. The simplest case is wherein the inverter 2405 is the identity and the function implemented by 2400 is an addition over GF(4).

Figure 26:
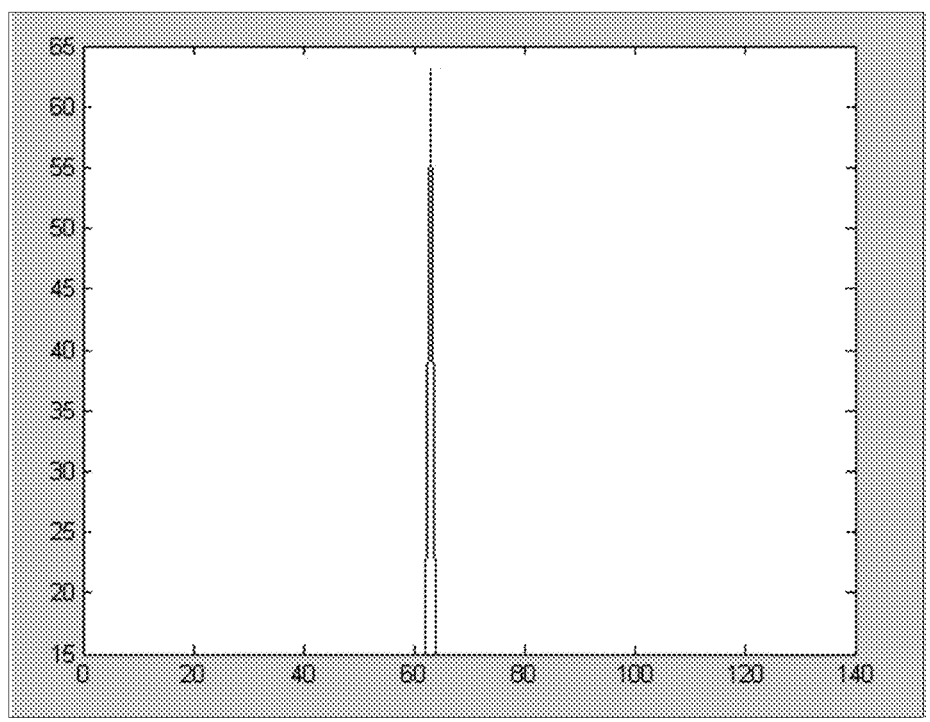
Figure 27:
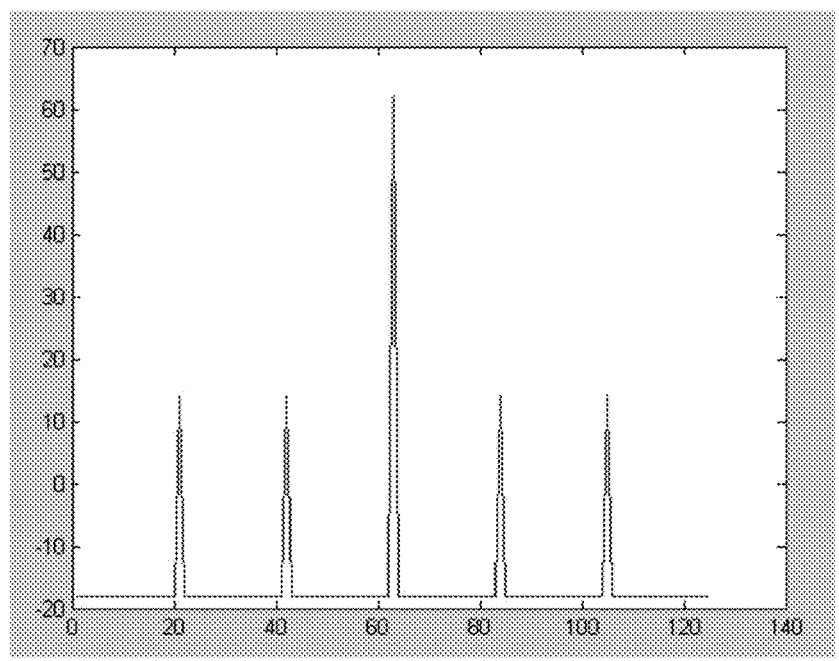

An auto-correlation graph by using multiplication and addition of the sequence generated by the first sequence generator is shown in FIG. 24. Herein symbols 0, 1, 2 and 3 are assigned values −1, 0, 1 and 2 to bring the graph around the 0 level. One can clearly see the side peaks. The auto-correlation graph using the modified correlation method by adding a fixed value (in this case 1) when corresponding symbols are identical is shown in FIG. 26. This graph shows only one peak. FIG. 27 shows the auto-correlation graph using multiplication and addition for a sequence generated by the second sequence generator. One can again see the side-peaks, now oriented upwards. The modified auto-correlation graph of this sequence will look exactly like the one in FIG. 26.

Figure 28:
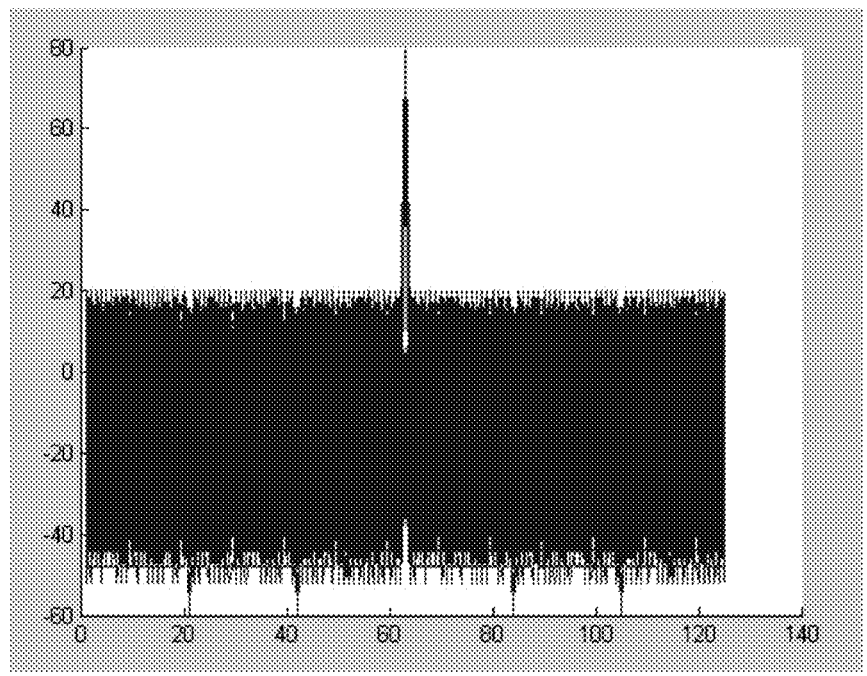
Figure 29:
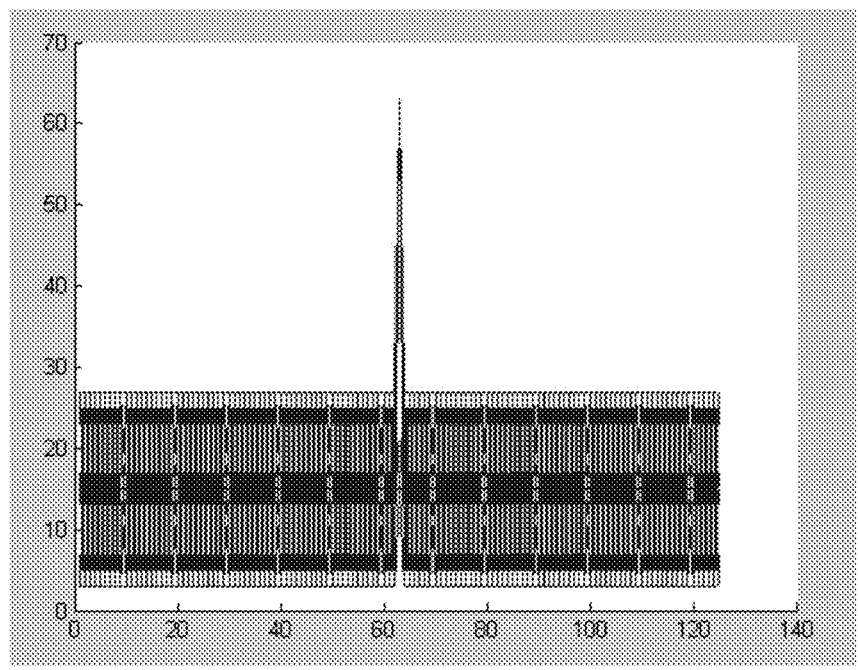
Figure 30:
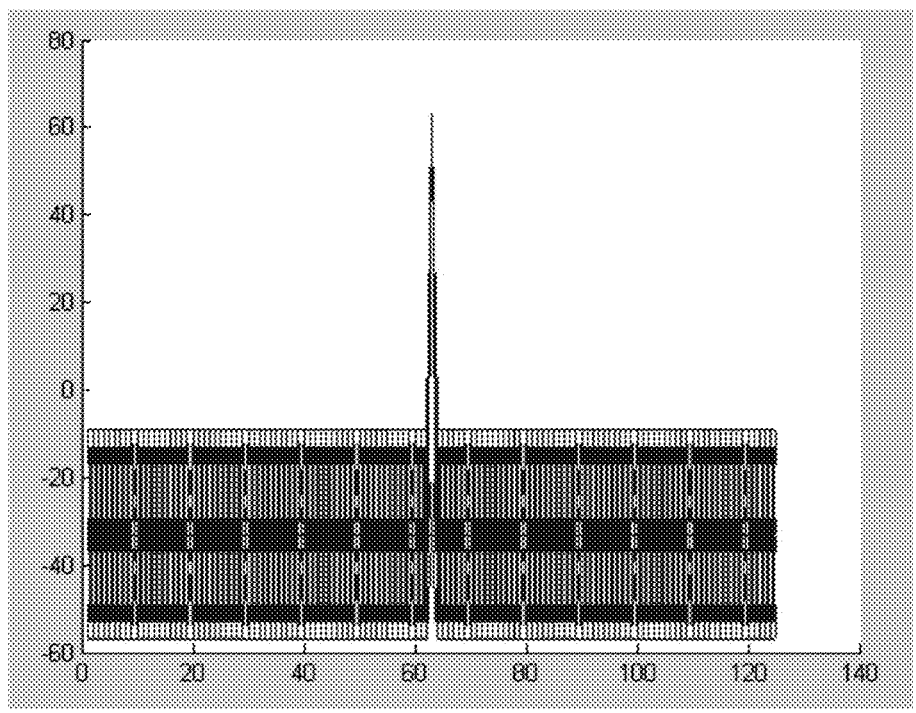

The superimposed cross-correlation and auto-correlation graphs of the Gold sequences formed by the circuit of FIG. 24 using the correlation method with multiplication and addition is shown in FIG. 28. FIG. 29 shows the superimposed correlation graphs using the modified method. FIG. 30 shows the superimposed correlation graphs by adding a constant (in this case 1) when symbols are identical and subtracting a constant (also 1 in this case) when symbols are not identical. It should be clear that one may also add for instance 4 or nothing any other number when corresponding symbols are identical and subtract for instance 3 or nothing or any other number when corresponding symbols are different.

Figure 31:
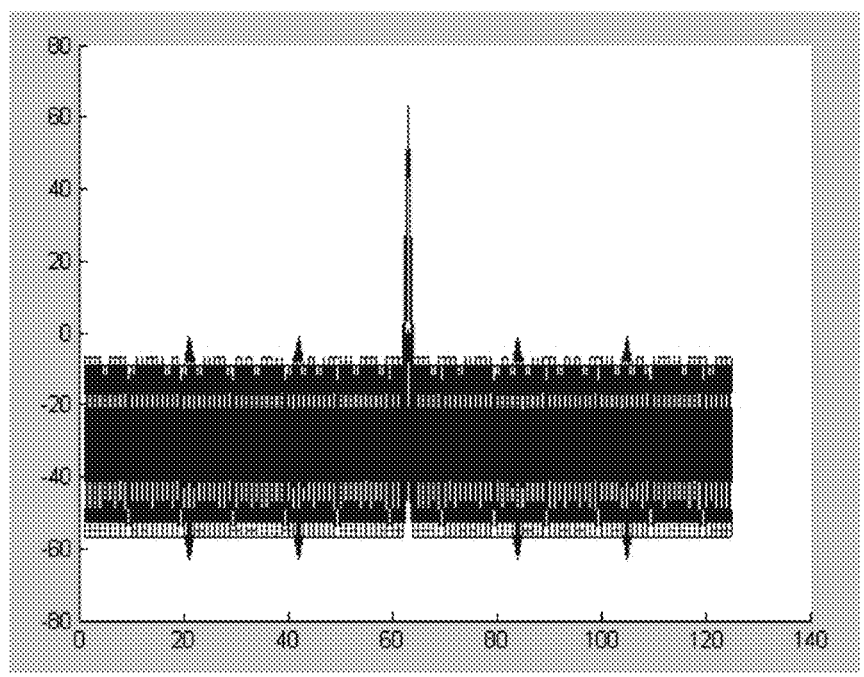
Figure 32:
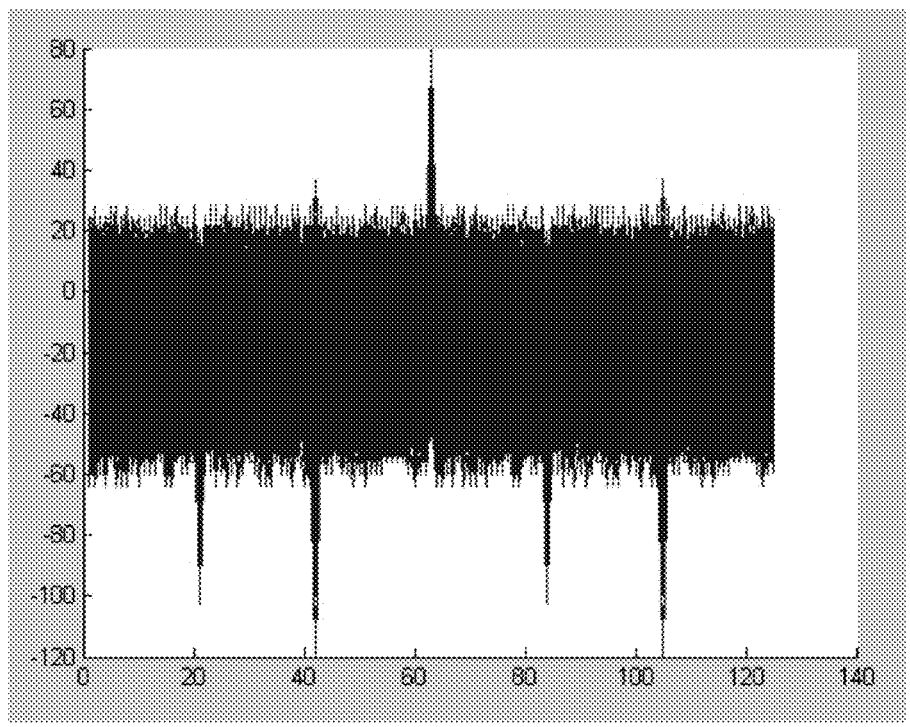

One may combine the sequences by the circuit of FIG. 24 to achieve the Gold sequences. Herein, 2400 may implement the addition over GF(4) and inverter 2405 may be an 4-state inverter, which is preferably a reversible 4-state inverter including the identity. While not shown, one may also include an n-state inverter in input 2401 and/or an inverter in the output 2405 to generate a Gold sequence. By using different n-state inverters one thus can create multiple sets of n-state sequences. The superposition of the correlation graphs of 3 such sets is shown in FIG. 31 (using a modified correlation) and in FIG. 32 (using multiplication and addition). These sets are generated by using the earlier disclosed Gold generator but by using 3 different sets of n-state reversible inverters wherein in the example inputs 2401 and 2402 have inverters that are different from each other. While the cross-correlation of the sequences has slightly deteriorated it is still significantly lower than the auto-correlation peak. The standard correlation shows some inverse correlation. It should be clear that one may replace the implementation of the 4-state logic function implemented in 2400 with one or two inverters at the input and/or with an inverter at the output by a single 4-state function, modified in accordance with the inverters.

Figure 33:
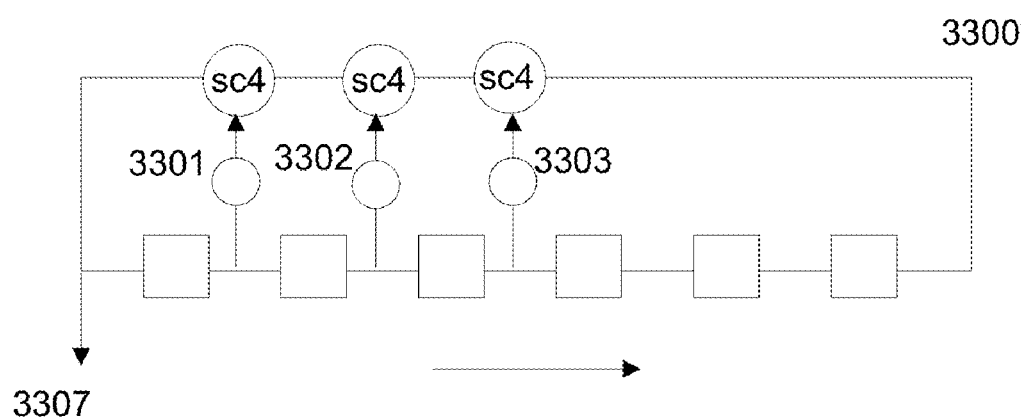
FIGS. 33-34 are diagrams of a sequence generator in accordance with an aspect of the present invention.
Figure 34:
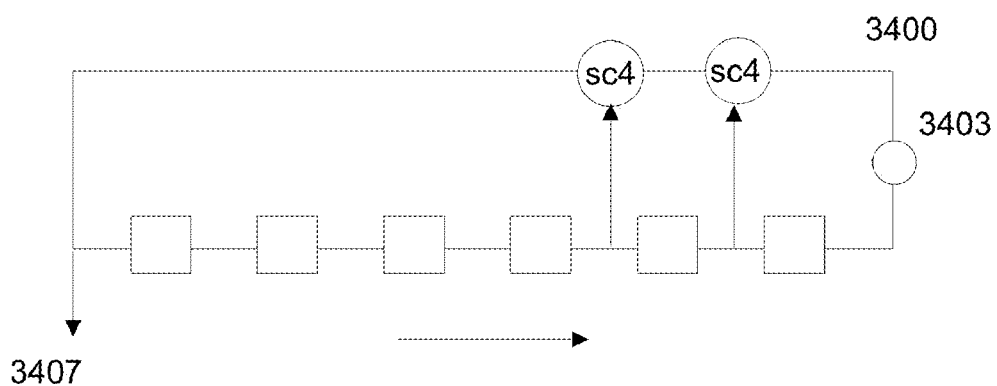

A further example of n-state sequence generators with n=4 is provided in FIGS. 33 and 34. FIG. 33 shows a 4-state sequence generator 3300 of an m-sequence of length of 4095 4-state symbols on output 3307 of the LFSR, implementing functions sc4, which are additions over GF(4) and inverters 3301 and 3303 ([0 1 2 3]→[0 1 3 2]) and 3303 ([0 1 2 3]→[0 2 1 3]). FIG. 34 shows a 4-state sequence generator 3400 of an m-sequence of length of 4095 4-state symbols on output 3407 of the LFSR, implementing functions sc4, which are additions over GF(4) and inverter 3403 ([0 1 2 3]→[0 2 3 1]). For simplicity these sequence generators all have inverters that invert state 0 to state 0. However, many more sequence generators using n-state inverters that do not invert state 0 to state 0 are possible. For instance in FIG. 34 the taps from the 4$^{th}$, 5$^{th}$ and 6$^{th}$ shift register element may contain the inverters [0 1 2 3]→[1 3 2 0], [0 1 2 3]→[0 3 1 2], and [0 1 2 3]→[0 2 3 1] respectively to establish a 4-state m-sequence of 4095 symbols.

Figure 35:
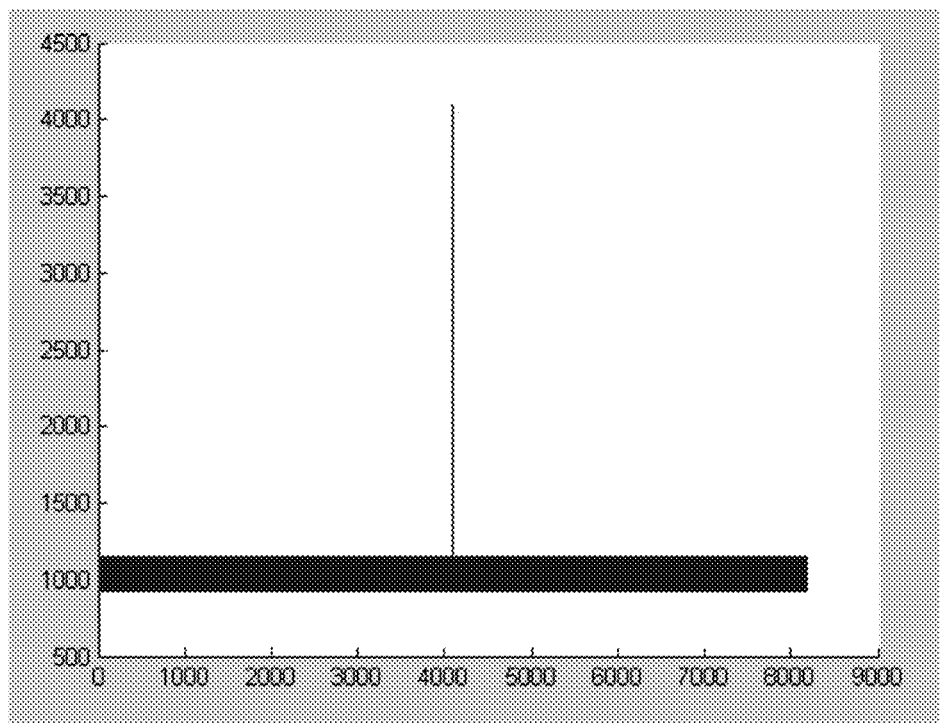
FIGS. 35-38 are correlation graphs generated in accordance with one or more aspects of the present invention.
Figure 36:
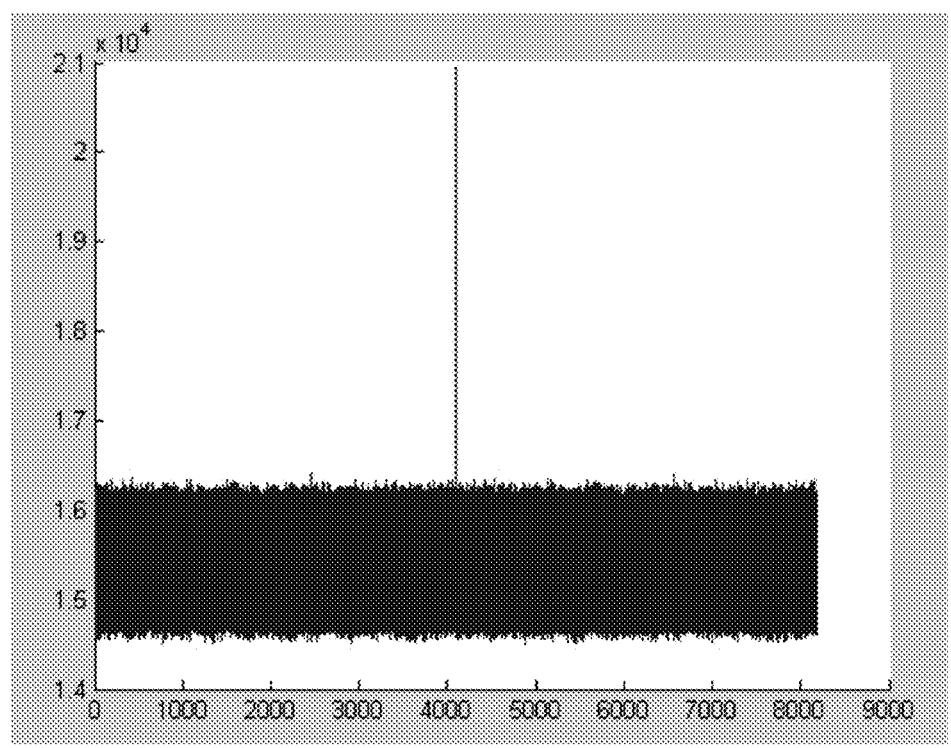

One may generate a set of Gold or Gold-like sequences by combining the sequences as generated by 3300 and 3400 wherein for instance the sequence of 3400 is shifted for each generated Gold sequence with the addition over GF(4) as shown in FIG. 24. One may also combine the sequences by an implementation of a 4-state logic function with 4-state inverters at one or both of the inputs and/or at the output to generate different sets of Gold-like sequences. Each set of Gold-like sequences generated from the same pair of 4-state generators (of which at least one may be shifted) is then part of a meta-set of Gold-like sequences, as was shown above. The cross-correlation of all the sequences of the meta-set may be less discriminating than the cross-correlation of a single set. However, as the length of a sequence improves, so does the correlation. FIG. 35 shows a graph of the superimposed modified correlation graphs of 50 sequences of a set of Gold sequences as generated from the generators of FIGS. 33 and 34. FIG. 36 shows a superimposed correlation graph of a limited number of sequences of the above set using standard correlation methods applying multiplication and addition.

Figure 37:
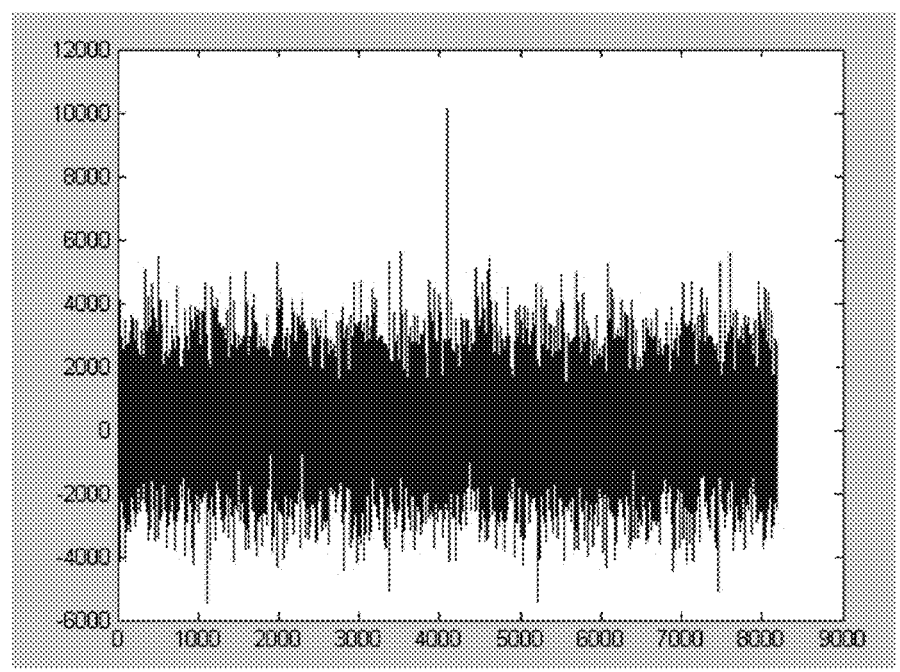

FIG. 37 shows the superimposed correlation graph of 100 sequences of the above set against one of the sequences in the 100, by using the standard correlation method and by making the signals representing the 4-state signals balanced ([0 1 2 3]→[−2 −1 1 2]). One can see that the non-matching sequences in the set can be considered as noise.

When n increases or when the number of shift register elements increases the m-sequences become much longer. One may do a search for configurations of sequence generators based on all functions being additions over GF(n) wherein the functions are connected to the outputs of shift register elements (either in Galois or in Fibonacci configuration) with a tap that is either an open tap such as a multiplier 0, an identity inverter or any other n-state inverter which is preferably reversible. An n-state logic has n! reversible inverters. So, a 4-state logic has 24 reversible inverters. One thus has to go through numerous configurations, which each configuration requiring a correlation calculation to determine if the configuration generates an n-state m-sequence.

It is preferred that one uses the modified correlation method as disclosed herein which adds a fixed number when corresponding symbols are identical. One may apply an iterative approach to select the appropriate configurations. One may also apply a reduced correlation calculation. In general for a correlation graph as shown herein, one determines a correlation graph of one sequence against a second sequence. The second sequence is selected from an enlarged sequence which is formed from the original second sequence which is enlarged by preceding it with a back-shifted second sequence and a forward shifted second sequence. For instance assume that the second sequence is $[a_1\ a_2\ a_3\ \ldots\ a_{n-1}\ a_n]$. The enlarged shifted sequence is then $[a_2\ a_3\ \ldots\ a_{n-1}\ a_n\ a_1\ a_2\ a_3\ \ldots\ a_{n-1}\ a_n\ a_1\ a_2\ a_3\ \ldots\ a_{n-1}]$. This explains why there is at least one central peak when one determines a correlation between the sequence $[a_1\ a_2\ a_3\ \ldots\ a_{n-1}\ a_n]$ and all possible portions of $[a_2\ a_3\ \ldots\ a_{n-1}\ a_n\ a_1\ a_2\ a_3\ \ldots\ a_{n-1}\ a_n\ a_1\ a_2\ a_3\ \ldots\ a_{n-1}]$. The correlation graph thus has 2*n-1 correlation points. FIG. 27 shows that in a standard correlation graph side peaks will appear. However, for initial correlation one may apply a reduced correlation on a reduced enlarged shifted second sequence.

Figure 38:
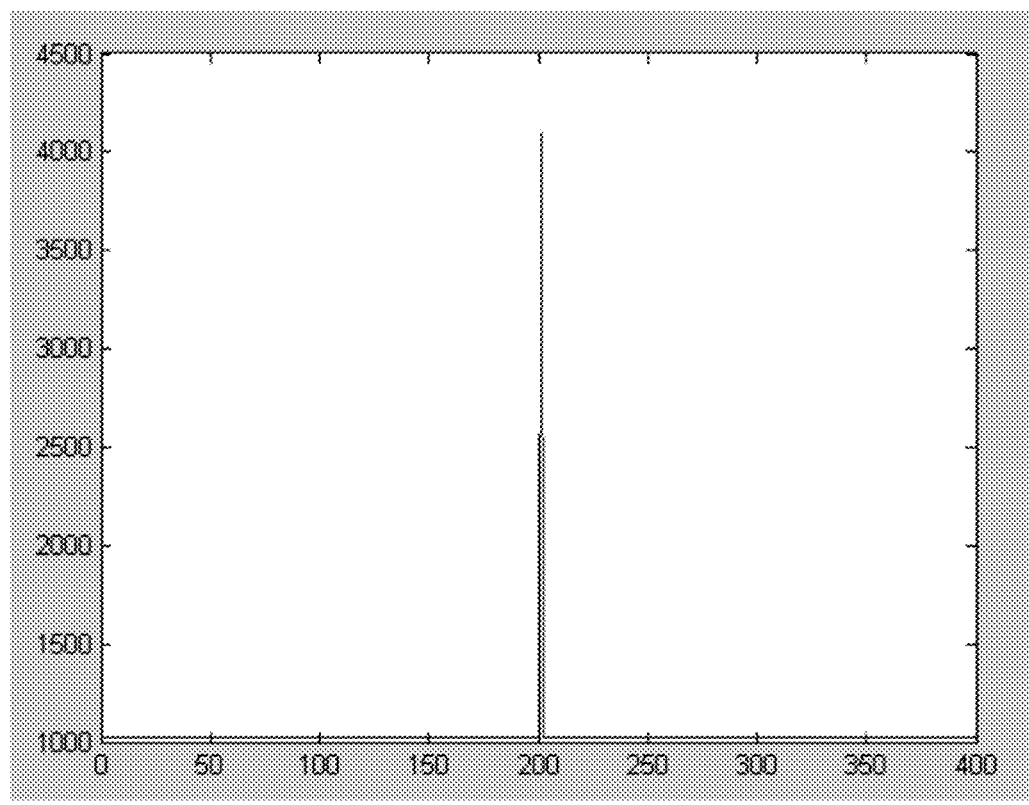

For instance, the 4-state case with a sequence generator with 6 shift register elements the m-sequence has 4095 symbols. A full correlation graph thus has 2*4095-1 correlation points of which each correlation point is derived from 4095 sets of corresponding symbols. To reduce the number of calculations one may create a correlation graph from a reduced enlarged shifted second sequence that is for instance $[a_p\ a_{p+1}\ \ldots\ a_{n-1}\ a_n\ a_1\ a_2\ a_3\ \ldots\ a_{n-1}\ a_n\ a_1\ a_2\ a_3\ \ldots\ a_p]$ wherein $p \ll n$. FIG. 38 shows a reduced correlation graph of a 4-state m-sequence of 4095 symbols by extending the enlarged shifted sequence by merely 200 symbols to the left and the right. By using the modified correlation method of adding a number (in this case 1) when corresponding symbols are identical one obtains the single peak correlation graph of FIG. 38. The peak value at 4095 shows that correlation is against another 4095 symbol sequence. One may apply the same approach of reduced extended length in applying the standard correlation method involving multiplication and addition. In that case the reduced correlation graph will also have only one peak, as the side peaks appear about 1000 symbols to the left or the right.

The standard method requires more calculations. By itself the appearance of side peaks should not be a severe limitation to determine if a sequence is an m-sequence by using the standard correlation calculation involving multiplication. Assume that a standard correlation will generate 2*n−1 correlation values that can be represented as $[h_2\ h_3, ,, h_1\ h_2 \ldots h_{n-1}]$. One may re-order the values in descending order. This will provide in the standard correlation method $[h_1\ m_1\ m_2\ m_3\ m_4\ m_5\ m_6\ m_7 \ldots]$. The value hl is the peak value. In the 4-state situation there may be 4 side peaks. However, all other correlation values are identical. Accordingly, one may check, for instance, if all values $(m_5\text{-}m5)$, $(m6\text{-}m5)$, $(m7\text{-}m6)$ etc. are zero. A similar method may be applied in the modified correlation case. However, because there are no side-peaks in that case one may determine if all values after the single peak are identical, for instance by subtracting all values (except the peak) by one of the values. One may determine the absolute difference and then add all absolute differences, which should add up to zero, if the sequence is an m-sequence.

Sometimes it may be required to find out if a correlation graph contains a certain number of peaks. It may be too involved to perform true multiplications. One may apply a modified standard correlation, wherein rather than a multiplication a value assignment takes place on the basis on the states of the symbols. For instance one may apply the 4-state logic function with the following truth table cor4 to determine a correlation value between two corresponding symbols.

| cor4 | 0 | 1 | 2 | 3 |
|------|---|---|---|---|
| 0 | 0 | 0 | 0 | 0 |
| 1 | 0 | 1 | 0 | 0 |
| 2 | 0 | 0 | 2 | 0 |
| 3 | 0 | 0 | 0 | 3 |

Figure 39:
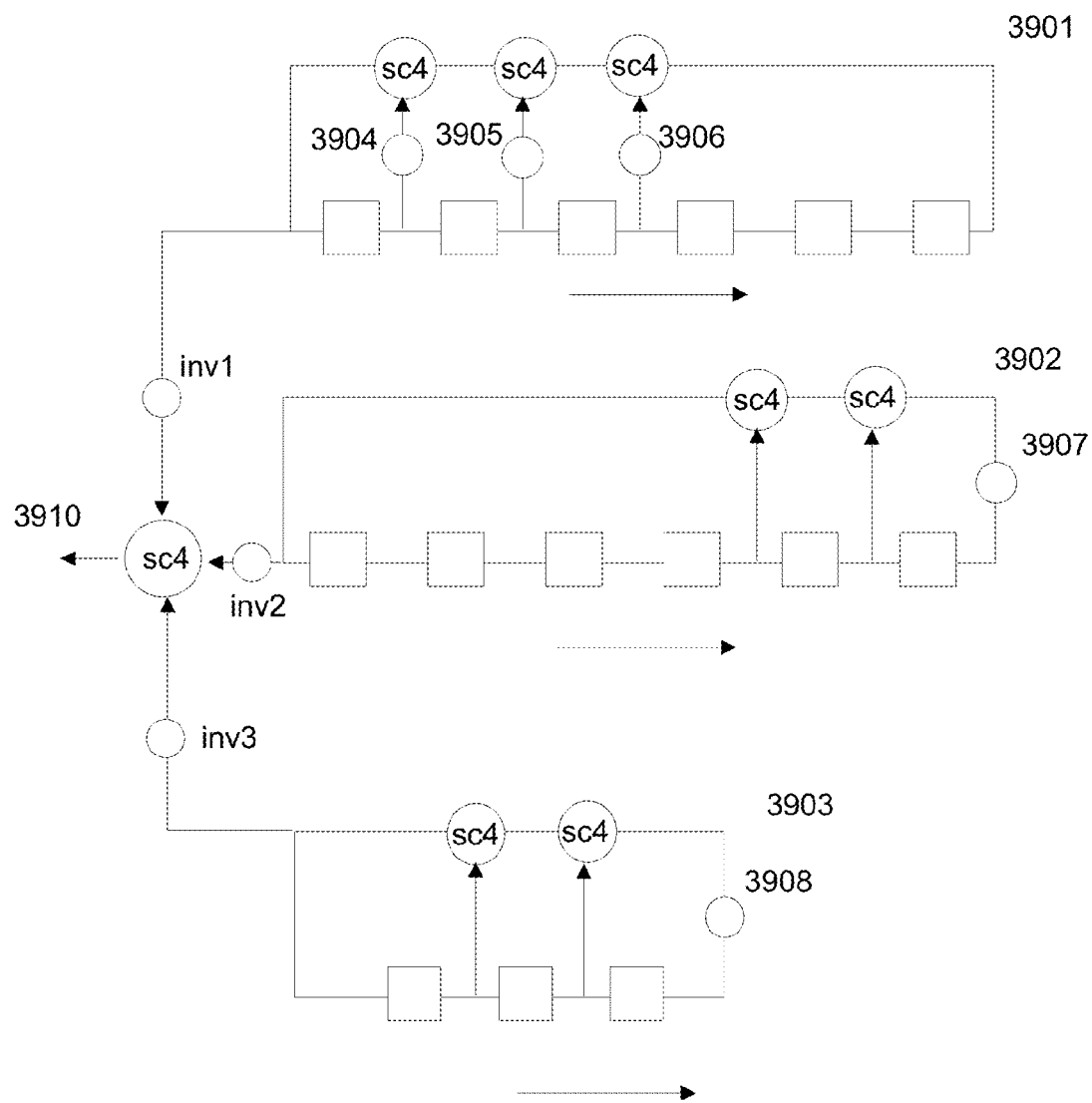
FIG. 39 is a diagram of a sequence generator in accordance with an aspect of the present invention.

As a further aspect of the present invention methods and apparatus are provided for generating n-state sequences that are formed by combining earlier generated sequences. It was already shown that series of n-state Gold and Gold-like sequences can be formed by combining at least two n-state m-sequences of identical length. As a further aspect, the forming of n-state sequences by using at least two sequences each having a different repetition rate. Some of these sequences are known in binary form as Kasami sequences. The related sequence generators are Kasami sequence generators. In general, n-state Kasami sequence generators as an aspect of the present invention combine the output of three different n-state generators as shown in FIG. 39. FIG. 39 shows as an illustrative example a 4-state Kasami sequence generator for generating a 4095 4-state symbol Kasami sequence. The 4-state generator comprises in this example a 6-stage 4-state sequence generator 3901, a 6-stage 4-state sequence generator 3902, and a 3-stage 4-state sequence generator 3903. All circuits work where required under a clock signal, which is not shown, but should be assumed. Sequence generators 3901 and 3902 may form a pair to generate Gold sequences. In order to increase the number of n-state sequences in the group of n-state Kasami sequences, one further includes a sequence generator 3903 which has a shorter repetitive cycle than the other generators. In binary examples, one calls the generator 3903 a generator of a decimated sequence. In the n-state (or 4-state) example a 3-stage 4-state LFSR based generator is used that will generate a 4-state m-sequence of length 63. All functions in the example of FIG. 34 are additions over GF(4) indicated by sc1. This is for simplicity reasons only. Other functions may be applied. Furthermore, the sequence generator 3901 uses 4-state inverters 3904, 3905 and 3906: [0 1 2 3]→[0 1 3 2], [0 1 2 3]→[0 2 1 3], and [0 1 2 3]→[0 1 3 2]. The sequence generator 3902 uses 4-state inverters: identity, identity and 3907 which is [0 1 2 3]→[0 2 3 1]. The sequence generator 3903 uses the same inverters as 3902 with 3908 being [0 1 2 3]→[0 2 3 1]. It should be noted that n-state inverters transforming state 0 in a different state my also be used and are specifically contemplated.

The symbols of the sequences are combined by an implementation of the function sc4. The function sc4 is associative. Accordingly, one may implement the function sc4 for combining symbols of three sequences, by using two implementations of sc4: a first to combine for instance the symbols of 3901 and 3902 into a new combined symbol and a second implementation to combine the combined symbol with a symbol from 3903 to be generated on generator output 3910. The symbols generated by 3901, 3902 and 3903 may be inverted by n-state inverters inv1, inv2, and inv3. For a first example these inverters are assumed to be identity.

Figure 40:
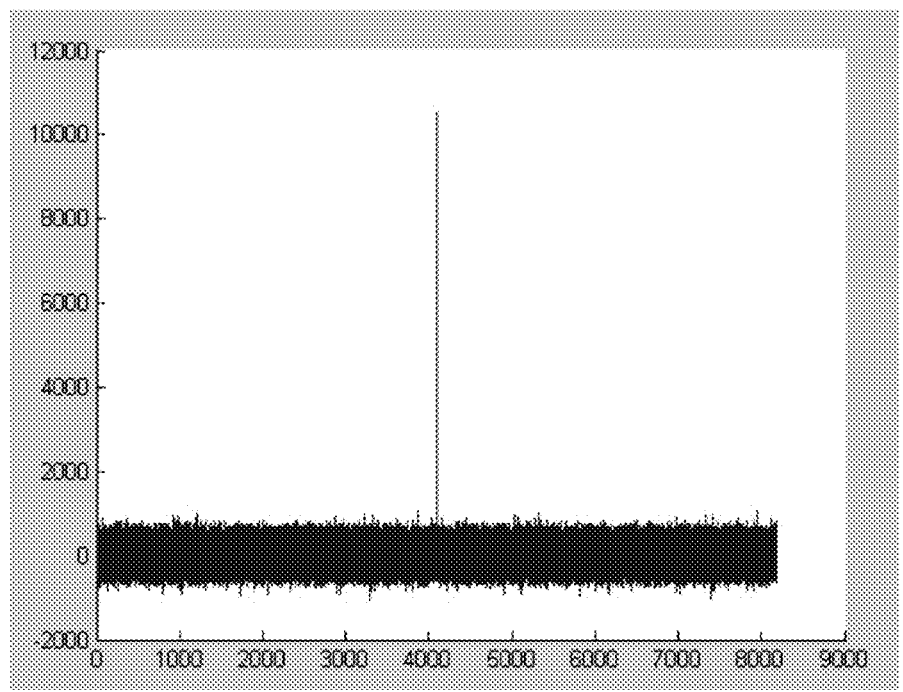
FIGS. 40-42 are correlation graphs generated in accordance with one or more aspects of the present invention.
Figure 41:
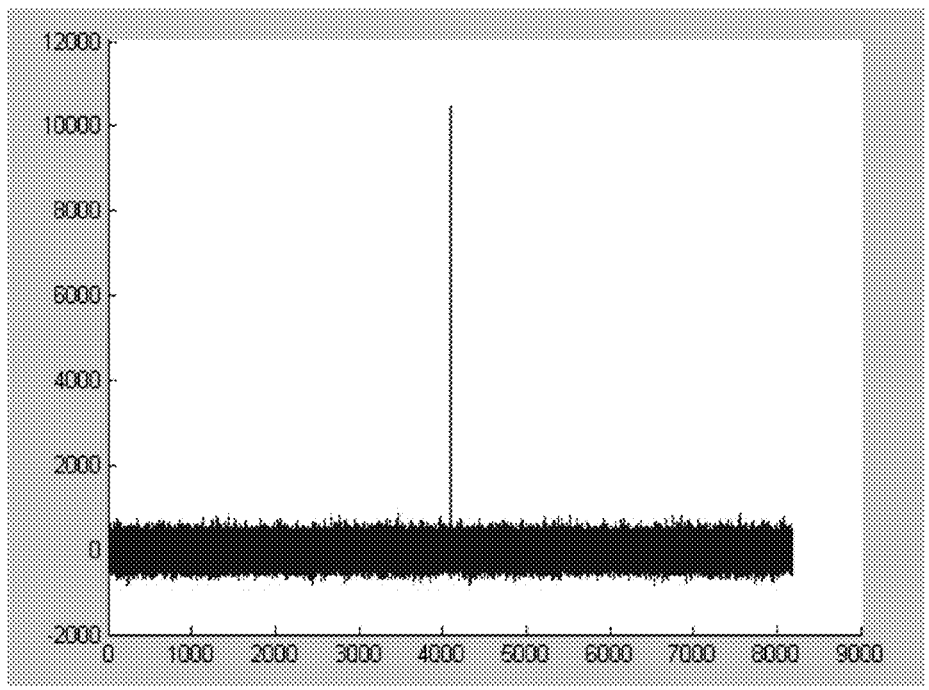

FIG. 40 shows the superimposed correlation graph of the correlation of 1 sequence thus generated with 10 sequences of the set of 4-state Kasami sequences, included the auto-correlation. The correlation is determined in a standard way, using multiplication and addition and by balancing the symbols in value according to [0 1 2 3]→[−2 −1 1 2]. One can see the considerable differentiation between the cross-correlation values and the peak value. FIG. 41 shows a similar correlation graph for 10 sequences generated by the Kasami generator of FIG. 39 wherein inv1 and inv2 are identity inverters and inv3 is inverter [0 1 2 3]→[2 1 3 0]. One may actually generate a large series of sets of Kasami sequences by modifying the inverters on inputs or output of the combining circuit.

Figure 42:
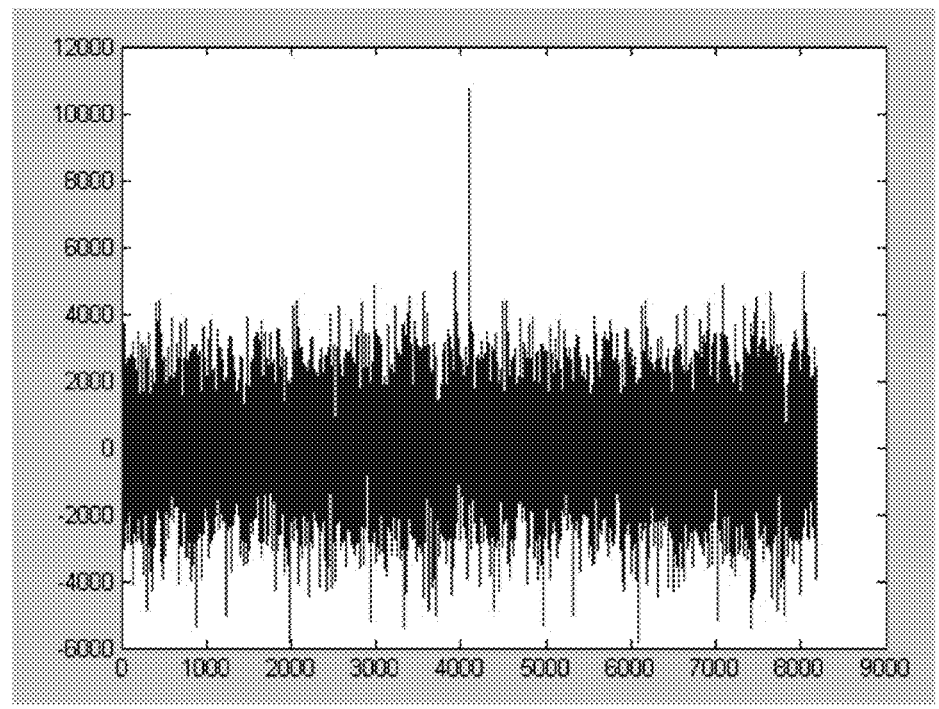

FIG. 42 shows a correlation graph, using a standard correlation method of 1 sequence of a Kasami set against 100 added sequences to demonstrate the possibility to distinguish sequences from background noise. Sequence generators for n>4

Figure 43:
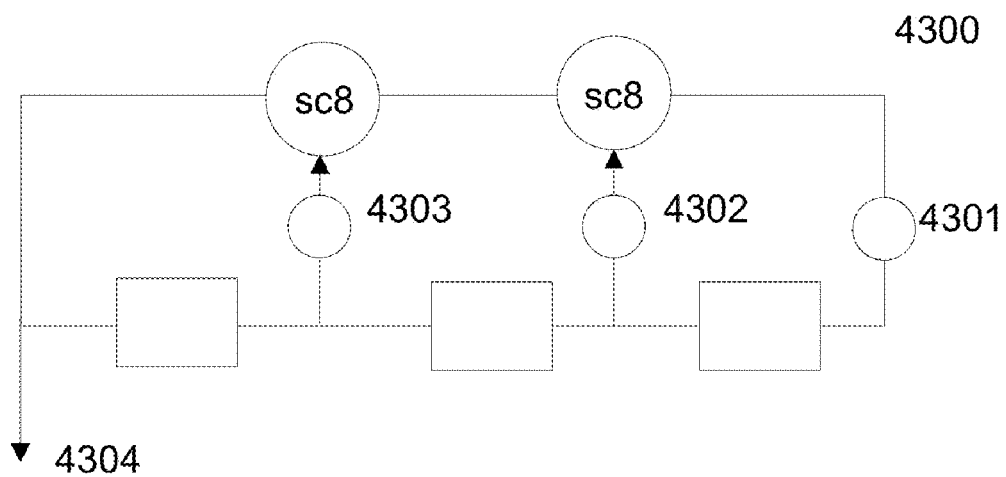
FIG. 43 is a diagram of a sequence generator in accordance with an aspect of the present invention.

FIG. 43 shows a diagram of an 8-state 3-stage LFSR based sequence generator for generating 511 8-state symbols. The functions sc8 are implementations of an addition over GF(8) of which the truth table is provided in the following table.

| GF(8)+ | 0 | 1 | 2 | 3 | 4 | 5 | 6 | 7 |
|--------|---|---|---|---|---|---|---|---|
| 0 | 0 | 1 | 2 | 3 | 4 | 5 | 6 | 7 |
| 1 | 1 | 0 | 4 | 7 | 2 | 6 | 5 | 3 |
| 2 | 2 | 4 | 0 | 5 | 1 | 3 | 7 | 6 |
| 3 | 3 | 7 | 5 | 0 | 6 | 2 | 4 | 1 |
| 4 | 4 | 2 | 1 | 6 | 0 | 7 | 3 | 5 |
| 5 | 5 | 6 | 3 | 2 | 7 | 0 | 1 | 4 |
| 6 | 6 | 5 | 7 | 4 | 3 | 1 | 0 | 2 |
| 7 | 7 | 3 | 6 | 1 | 5 | 4 | 2 | 0 |

A first 8-state sequence generator has inverters 4303 is [0 1 2 3 4 5 6 7]→[0 0 0 0 0 0 0 0] or is an open tap; 4302 is [0 1 2 3 4 5 6 7]→[0 1 2 3 4 5 6 7] or a straight through connection or an identity inverter, which are of course all the same; and 4301 is [0 1 2 3 4 5 6 7]→[1 5 3 6 4 2 7 0] to generate a first 8-state m-sequence of 511 symbols.

A second 8-state sequence generator has inverters 4303 is [0 1 2 3 4 5 6 7]→[0 5 6 7 1 2 3 4]; 4302 is [0 1 2 3 4 5 6 7]→[0 7 1 2 3 4 5 6]; and 4301 is the same as 4303, to generate a second 8-state m-sequence of 511 symbols.

Figure 44:
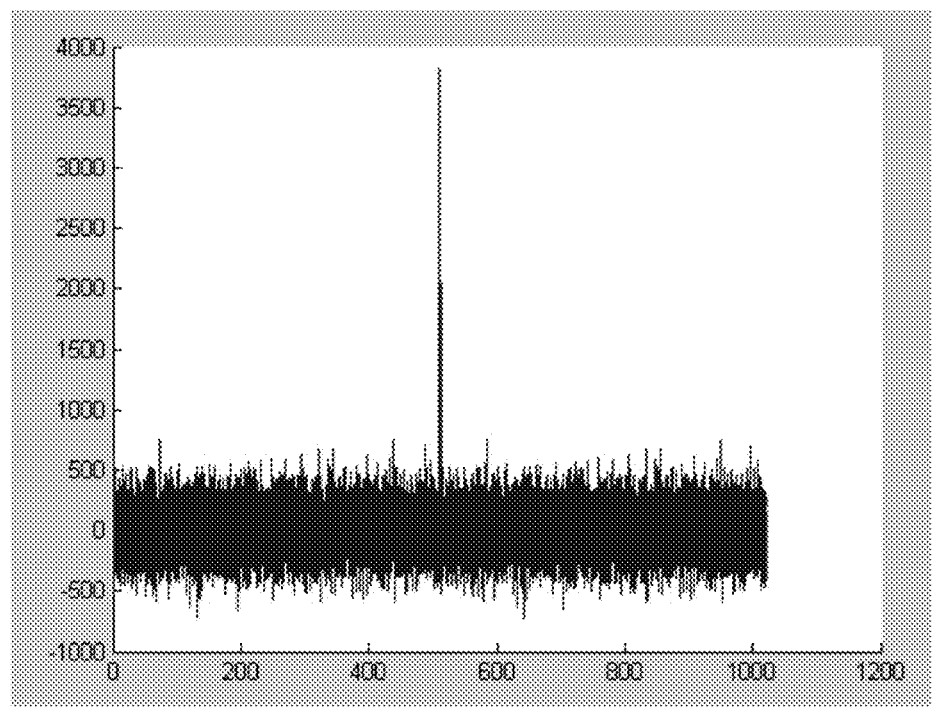
FIGS. 44-45 are correlation graphs generated in accordance with one or more aspects of the present invention.

One may combine the two sequences by using a combining circuit such as shown in FIG. 24 which implements for the 8-state case for instance an 8-state combining function such as sc8 being an addition over GF(8) of which one or both of the inputs includes an 8-state inverter. One creates an 8-state 3-stage LFSR based Gold-sequence by individually combining 2 corresponding 511 8-state symbols as generated by the above provided sequence generators into an 8-state Gold sequence of 511 symbols. One may then shift the first sequence that is to be combined by at least one symbol, and combine the shifted first sequence with the second sequence to generate another 8-state Gold sequence. One may thus generate a set of 8-state Gold sequences, of up to 511 sequences. One may insert an inverter at one or two of the inputs or the output of the combining circuit of which an example diagram is shown in FIG. 24 or use different inverters from previously used to generate a new set of related Gold sequences to form a series of sets of Gold sequences. A superimposed correlation graph including the auto-correlation of one 8-state sequence of 25 8-state Gold sequences is shown in FIG. 44, wherein a standard correlation method using multiplication is applied.

It should be clear that all methods and apparatus for generating and testing sequences can be created for 3-state, 4-state, 5-state or any n-state situation.

In one embodiment one may search for p-stage LFSR configurations that are n-state maximum length sequence generators by testing all possible inverter configurations of the LFSR further using functions that are additions over GF(n). After initialization one may have a generator generate $p^n-1$ n-state symbols and to determine if the sequence is an m-sequence with one of the previously provided correlation methods. If a sequence is an m-sequence one may then use the selected n-state inverters. In general one may use at least three sets of n-state inverters. In a first set one may use all multipliers of which there are n including multiplier 0 and 1 to be used in any relevant tap. The last tap cannot be 0, or otherwise there would be no feedback. In general one may test at least $n^p-1$ configurations. One should keep in mind that at least one other tap cannot be 0.

In a further embodiment one may use all reversible n-state inverters of which there are n! including the identity but excluding the open connection. Accordingly, one may have to test around $(n!+1)^p$ configurations to find all possible m-sequence generators with p stages. In those situations it may be advantageous to use reduced correlation methods.

In a further embodiment one may use the multipliers plus all other reversible inverters that invert state 0 to state 0.

It was already shown above that for forming new sequences such as Gold or Kasami sequences one may use a combining n-state function that is modified by an n-state inverter at one or more of the inputs or at the output of the combining device. The selection of inverters may affect the overall correlation of the set or series of sets of sequences that one may create. Herein a Gold sequence will be intended to mean a sequence formed by combining two equal length sequences, which are preferably of maximum-length. A Kasami sequence will be intended to mean a sequence formed by combining at least three sequences.

The examples provided herein are illustrated by using LFSRs in Fibonacci configuration. The use of LFSRs in Galois configuration is fully contemplated.

Sequences and sequence generators as provided herein may be applied in a wide range of applications, including communication, cryptography, data storage and embedded in digital documents. As was shown above, the use of sequences are useful in spread-spectrum type of communications, for instance in a receiving device and/or transmitting device such as a mobile phone in a mobile telephone communication system.

In accordance with an aspect of the present invention at least one n-state sequence with n>2, or n>3 or n>4 is generated by using a sequence generator. A sequence generator is a device that may be implemented in a processor to generate an n-state sequence. The sequence generator is provided with an initial condition. Such an initial condition may be the initial condition of a shift register. The initial condition may also be input sequences to a combining circuit, or any other initial condition. However, ultimately the sequence generator provides a sequence that is generated or that is created by using a sequence generator and that is different from the initial condition. One may generate a sequence and store it in a memory. If the stored sequence was generated with the help of a sequence generator, it will still be considered a sequence that was generated with a sequence generator. A sequence generator works autonomously after being initialized. By itself reading a sequence from a memory is not considered to be a sequence generator. However, as stated before, if a sequence was generated by an initialized sequence generator to generate a sequence that is stored, then one may consider the stored sequence as being generated by a sequence generator. One condition for an n-state sequence generator is including at least one implementation in a device of an n-state logic function to use the initialization to generate an n-state sequence.

One may determine a correlation between two sequences (or between a sequence and a copy thereof) with a correlation method or apparatus that determines if a sequence is a maximum-length sequence. In one embodiment the correlation is determined by adding a fixed value (which may be 1) to a sum when two corresponding symbols are identical. In a further embodiment one may also subtract a fixed value when two corresponding symbols are not identical. In a further embodiment one may use a standard correlation method/apparatus by multiplying values of corresponding symbols and adding the resulting product to a sum. In yet a further embodiment one may use adding a value to a sum wherein such a value depends upon the value of the first and/or the second symbols that are being compared.

In yet a further embodiment, one may use correlation numbers related either to a complete or to a reduced correlation graph to determine if a sequence is an m-sequence. Herein, one reorganizes the correlation values for instance in descending order. Auto-correlation numbers of an m-sequence using the modified correlation method/apparatus have correlation values that represent a single peak and all other values are identical. Accordingly, one has to test these correlation values if only one peak occurs. In other correlation methods/apparatus two or more side-peaks may occur. However, besides a finite number of side-peaks all other correlation numbers are equal. Accordingly, one has to detect if after a number of side-peaks all other values are equal.

This process can be illustrated with the following Matlab script. Assume that a an m-sequence of p n-state symbols generates a full correlation graph as for instance shown in FIG. 26 (a 4-state m-sequence of 63 symbols with a 125 point correlation graph corr4). One may then for instance order the correlation values in descending order with: corr4order=sort (corr4, 'descend'). If one had applied the modified correlation method that adds a fixed number when corresponding symbols are equal, one has only one peak if the sequence is an m-sequence and one does not shift not more than (p−1) times to the left or the right. By sorting in descending order the first value in corr4order is the peak correlation value. All next values in corr4order should be identical if the sequence is an m-sequence. One may then take for instance the second value from the sorted values: base=corr4order(2). One may subtract the value base of all the non-peak values. To assure that one does not identify by accident a non m-sequence as an m-sequence one should determine the absolute value of the individual differences of the non peak values: dif4=sum(abs (corr4order(2:p)-base) (in this case p=125 for an m-sequence of 63 n-state symbols ). In the case of an m-sequence dif4 will be 0. The same approach applies with a reduced standard correlation method such as illustrated in FIG. 38.

Figure 25:
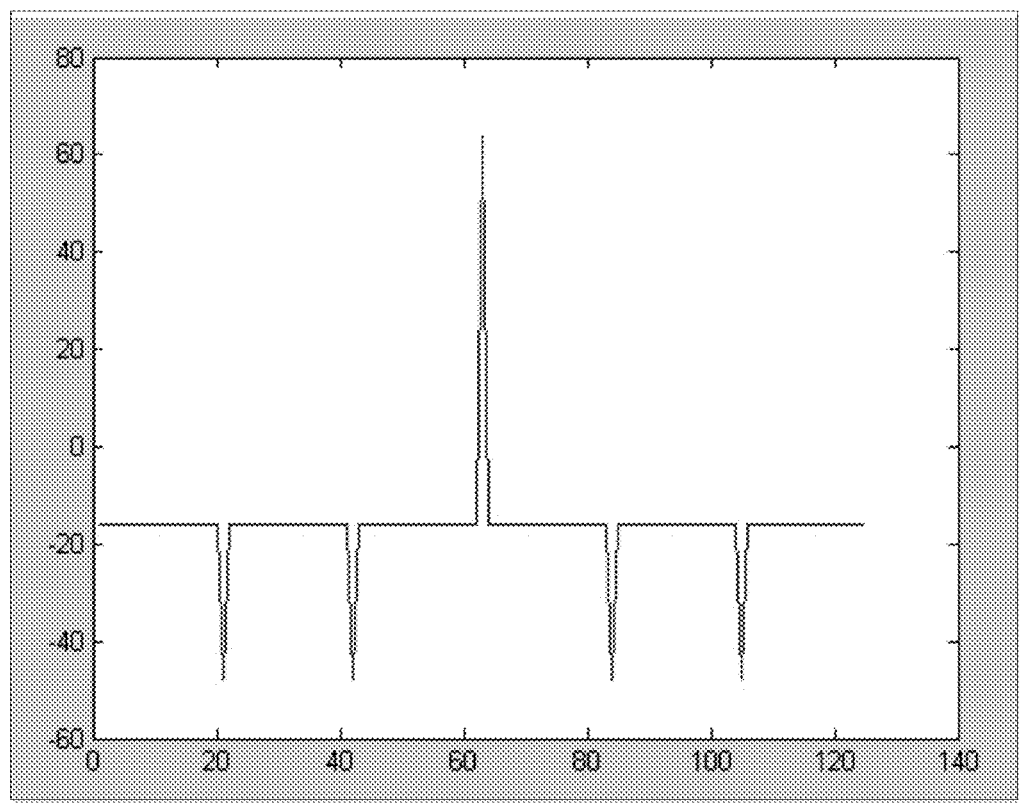
FIGS. 25-32 are correlation graphs generated in accordance with one or more aspects of the present invention.
Figure 45:
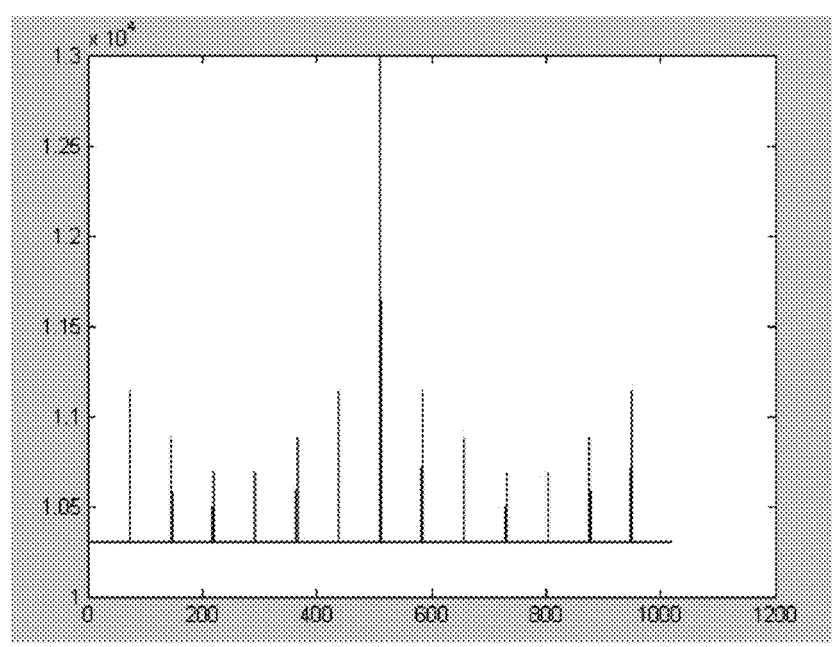

One will have to adapt the above steps for the application of the full standard correlation method, as this will generate additional side peaks as shown in FIG. 27. In that case one should take the number base from the sorted correlation values by skipping all of the side-peak values. FIG. 25 shows that the standard correlation graph may have side peaks that are smaller than the equal value of the majority of the correlation values. In that case it would be better to use the absolute value of the correlation value. An n-state m-sequence may have n or more side peaks at each side. One thus should skip at least the first 2*n+1 values in the sorted correlation values before determining if the remaining values are equal. These figures may increase with increasing n. The standard correlation graph of an 8-state m-sequence is shown in FIG. 45, demonstrating the need for skipping the values in a sorted series of correlation values that correspond to side peaks. Despite a considerable number of side-peaks still the majority of the correlation values will be equal to each other. In one embodiment that number will be greater than 90% of the correlation values in a full correlation graph. In a second embodiment that number will be greater than 50% of all the correlation values.

Implementation of all circuits may be done in n-state switching circuits, and all sequences may be generated in sequences of signals, wherein each individual signal has one of n states with n>2 or n>4. In some cases an n-state symbol may be represented by a single signal having two variable properties such as phase and amplitude.

The sequence generators as provided herein may use LFSRs. However, they may also not use LFSRs. For instance a sequence generator may use stored sequences that are provided to a combining circuit.

In a further embodiment all circuits and apparatus may be implemented in binary form and process an n-state symbol as a word of 2 or more bits. A sequence of n-state symbols then becomes a sequence of binary words. For instance a D/A converter may change a binary word into a single signal having one of n states. An A/D converter may convert an n-state signal into a binary word. Standard processors, having memory to store and retrieve data and instructions may be used to perform the steps as provided as one or more aspects of the present invention. It was already shown that sets of 4-state sequences of 4095 can be generated, wherein each symbol is represented by an n-state signal or by a binary word.

Generators, including LFSRs, combining functions and inverters can all be implemented on a processor. Binary methods and apparatus to process n-state sequences are also disclosed in U.S. Non-Provisional patent application Ser. No. 12/137,945 filed on Jun. 12, 2008 and in U.S. Non-Provisional patent application Ser. No. 12/273,262 filed on Nov. 18, 2008 which are both incorporated herein by reference in their entirety.

In a communication system wherein multiple sequences are being transmitted at the same time, one should use detection by using the standard correlation method. As can be seen from for instance FIG. 44 one can clearly detect one specific sequence embedded in 50 or more superimposed sequences. For obvious reasons, detection of a sequence from multiple super-imposed sequences is most likely not possible with the modified correlation method (which compares if a symbol is identical to a corresponding symbol) when signals representing symbols are magnitude based. However, in the case wherein signals are non-magnitude based or dependent (such as represented by different wavelengths of radiation) one may be able to detect a unique sequence between a plurality of sequences. When three n-state symbols each being represented by a wavelength $\lambda 1$ are received, a detector may still only detect "a symbol represented by $\lambda 1$". When at a certain time a symbol with wavelength $\lambda 1$ and two symbols with wavelength $\lambda 2$ are present, a detector may only detect the presence of a symbol represented by $\lambda 1$ and a symbol represented by $\lambda 2$. These signals will not be added to create a third symbol. One may thus be able to detect a sequence by using the modified correlation method.

Furthermore, if one receives one sequence at a time, it is possible to establish by applying the modified correlation method if a specific sequence was received. This may be applied for instance for synchronization purposes. For instance, it may be desirable to find a specific point on a hard disk or an optical disk. Optical disks enabled to store n-state symbols are known. One may also store n-state symbols as a plurality of binary symbols. In that case one is able to find a specific sequence of n-state symbols by applying the modified correlation method.

The following patent applications, including the specifications, claims and drawings, are hereby incorporated by reference herein, as if they were fully set forth herein: (1) U.S. Provisional Patent Application No. 60/575,948, filed on Jun. 1, 2004, entitled MULTI-VALUE CODING OF SEQUENCES AND MULTI-VALUE MEMORY DEVICES; (2) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (3) U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS; (4) U.S. Non-Provisional patent application Ser. No. 10/936,181, filed Sep. 8, 2004, entitled TERNARY AND HIGHER MULTI-VALUE SCRAMBLERS/DESCRAMBLERS; (5) U.S. Non-Provisional patent application Ser. No. 10/912,954, filed Aug. 6, 2004, entitled TERNARY AND HIGHER MULTI-VALUE SCRAMBLERS/DESCRAMBLERS; (6) U.S. Provisional Patent Application No. 60/501,335, filed Sep. 9, 2003, entitled TERNARY (3-VALUE) AND HIGHER VALUE DIGITAL SCRAMBLERS/DESCRAMBLERS IN DIGITAL COMMUNICATIONS; (7) U.S. patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (8) U.S.

Provisional Patent Application No. 60/599,781, filed Aug. 7, 2004, entitled MULTI-VALUED DIGITAL INFORMATION RETAINING ELEMENTS AND MEMORY DEVICES; (9) U.S. patent application Ser. No. 11/018,956, filed Dec. 20, 2004, entitled MULTI-VALUE DIGITAL CALCULATING CIRCUITS, INCLUDING MULTIPLIERS and (10) U.S. patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA.

The invention claimed is:

1. A method for determining with a processor of a correlation value between a first sequence of n-state symbols and a second sequence of n-state symbols, an n-state symbol having one of n states with n an integer and n>2, the n-state symbol being represented by a signal, comprising:
    providing the processor with the first sequence of n-state symbols, wherein the first sequence has at least three n-state symbols each with a different one of the n states;
    adding by the processor of a first value to a sum whenever an n-state symbol in the first sequence is identical to a corresponding symbol in the second sequence which has at least three n-state symbols each with a different one of the n states; and
    generating by the processor of a signal representing the correlation value when all signals representing the n-state symbols of the first sequence have been processed to determine the sum.

2. The method as claimed in claim 1, further comprising subtracting by the processor of a second value from the sum whenever an n-state symbol in the first sequence is different from a corresponding symbol in the second sequence.

3. The method as claimed in claim 1, wherein the method is applied to determine if the first sequence is a maximum length sequence determined by a correlation graph with a single peak.

4. The method as claimed in claim 3, further comprising combining each n-state symbol of the first sequence with a corresponding symbol of a third sequence by applying an implementation of an n-state logic function to generate a fourth sequence of n-state symbols.

5. The method as claimed in claim 1, wherein the first sequence is is applied in a data storage system.

6. The method as claimed in claim 1, wherein the first sequence is applied in a digital document.

7. The method as claimed in claim 1, wherein the first sequence is applied in a communication device.

8. The method as claimed in claim 1, wherein the n-state symbol is represented by a plurality of binary signals.

9. A method for determining with a processor a plurality of correlation values between a first sequence of n-state symbols wherein the first sequence has at least three n-state symbols each with a different state of the n states and a second sequence of symbols, an n-state symbol having one of n states with n being an integer with n>2, the n-state symbol being represented by a signal, comprising:
    determining a plurality of sequences from the second sequence;
    determining by the processor of a correlation value between the first sequence and the second sequence by adding by the processor a first value to a sum for each n-state symbol in the first sequence that is identical to a corresponding symbol in the second sequence, the correlation value being part of the plurality of correlation values; and
    determining by the processor of other correlation values of the plurality of correlation values by correlating the first sequence with each of the plurality of sequences;
    determining by the processor from the plurality of correlation values that the first sequence is a maximum length sequence determined by a correlation graph with a single peak.

10. The method as claimed in claim 9, wherein the first sequence of n-state symbols is determined by a Linear Feedback Shift Register (LFSR).

11. The method as claimed in claim 9, further comprising:
    combining each n-state symbol of the first sequence with a corresponding symbol of a third sequence by applying an implementation of an n-state logic function to generate a fourth sequence of n-state symbols.

12. The method as claimed in claim 9, wherein the first sequence is applied in a communication device.

13. The method as claimed in claim 9, wherein the n-state symbol is represented by a plurality of binary symbols.

14. An apparatus for providing a plurality of signals representing a plurality of correlation values between a first sequence of at least 3 n-state symbols each having a different of the n-states and a second sequence of n-state symbols, each n-state symbol having one of n states with n being an integer with n>2 and being represented by a signal, comprising:
    a processor enabled to execute instructions to perform the steps:
        comparing an n-state symbol in the first sequence with a corresponding n-state symbol in the second sequence;
        adding a first value to a sum whenever the n-state symbol in the first sequence is identical to the corresponding n-state symbol of the second sequence; and
        determining a correlation value from the sum after the n-state symbols in the first sequence and the corresponding n-state symbols in the second sequence have been compared.

15. The apparatus of claim 14, wherein the n-state symbol is represented by a plurality of binary signals.

16. The apparatus of claim 14, wherein the apparatus is part of a communication system.

17. The apparatus of claim 14, wherein the apparatus is part of a data storage system.

18. The apparatus of claim 15, wherein the apparatus is part of a communication system.

19. The apparatus of claim 14, wherein the n-state symbol is represented by a non-magnitude dependent signal.

20. The apparatus of claim 14, wherein the first sequence of n-state symbols is applied to generate a third sequence of symbols.

* * * * *